(12) United States Patent
Karuppana et al.

(10) Patent No.: US 6,465,908 B1
(45) Date of Patent: Oct. 15, 2002

(54) INTELLIGENT POWER MANAGEMENT SYSTEM

(75) Inventors: Samy V. Karuppana, Kent; Aly Amirali Jetha, Seattle, both of WA (US); Jes Thomsen, Copenhagen (DK)

(73) Assignee: Intra International AB (SE)

( * ) Notice: Subject to any disclaimer, the term of this patent is extended or adjusted under 35 U.S.C. 154(b) by 0 days.

(21) Appl. No.: 09/659,024

(22) Filed: Sep. 7, 2000

Related U.S. Application Data

(60) Provisional application No. 60/153,373, filed on Sep. 10, 1999.

(51) Int. Cl.[7] .................................................. H02J 1/00
(52) U.S. Cl. ........................................ 307/31; 307/10.1
(58) Field of Search ........................ 307/30, 31, 38–41, 307/9.1, 10.1, 10.2, 10.6, 10.7, 10.8, 140, 155; 395/750.01, 750.03, 750.06; 713/300, 330, 380; 323/908, 140

(56) References Cited

U.S. PATENT DOCUMENTS

| | | |
|---|---|---|
| 4,088,940 A | 5/1978 | Ciarniello et al. |
| 4,137,557 A | 1/1979 | Ciarniello et al. |
| 5,337,013 A | 8/1994 | Langer et al. |
| 5,798,577 A | 8/1998 | Lesesky et al. |
| 5,818,673 A | 10/1998 | Matsumaru et al. |
| 5,832,286 A * | 11/1998 | Yoshida .................. 395/750.06 |
| 5,856,711 A | 1/1999 | Kato et al. |
| 5,871,858 A | 2/1999 | Thomsen et al. |
| 5,886,422 A * | 3/1999 | Mills ............................ 307/29 |
| 6,194,792 B1 * | 2/2001 | Yanou et al. ........... 395/750.06 |
| 6,377,031 B1 * | 4/2002 | Karuppana et al. .......... 323/220 |

* cited by examiner

Primary Examiner—Jeffrey Sterrett
Assistant Examiner—Gary L. Laxton
(74) Attorney, Agent, or Firm—Sawyer Law Group LLP

(57) ABSTRACT

A method and system for managing power in a device having a power source is disclosed. The power source includes a power storage unit capable of storing a particular amount of power. The device is capable of performing a plurality of functions using the power storage unit alone. The method and system include providing a plurality of switches, a plurality of signal inputs and at least one controller. The plurality of switches are coupled with the power source. Each of the plurality of switches is coupled with a portion of the device and thus can cut off power to that portion of the device. The plurality of signal inputs is for receiving information from the device. The at least one controller is coupled with the plurality of switches and the plurality of signal inputs. The at least one controller is for controlling the plurality of switches to be open or closed based on software provided to the at least one controller. The at least one controller is also capable of controlling the plurality of switches based upon the information provided by the plurality of signal inputs.

33 Claims, 29 Drawing Sheets

680

Time

685

Time

INTELLIGENT POWER MANAGEMENT SYSTEM

This application claims the benefit of provisional application No. 60/153,373 filed Sep. 10, 1999.

FIELD OF THE INVENTION

The present invention relates to systems which may have a limited power supply and more particularly to a method and system for providing intelligent power management in such as system.

BACKGROUND OF THE INVENTION

Many systems utilize a power supply which may have a limited capacity. For example, truck tractors, boats, golf carts, and satellites may utilize a battery or other energy storage apparatus for DC electrical power. These devices may have a mechanism for recharging the battery, such as an alternator. However, on occasion these devices operate on the stored power from the battery. For example, a truck tractor typically includes an alternator for generating power, a battery for storing power, and various subsystems which may consume power. These power consumers include a cranking system; lights; computers; communication devices electronics for the engine, brakes, steering and other subsystems; and comfort devices such as heating cooling, ventilation, refrigeration, microwaves, and televisions. Many of the power consumers can operate on the stored power of the battery alone when the alternator is not generating power.

Breakdown of the electrical system can be the primary cause of failure for many of these devices, such as the tractor trailer. Even where the electrical system is less subject to malfunctions, breakdown of the electrical system can cause the device to be unable to function. Such a failure of the device may be expensive, both to repair and in other costs absorbed by the user. For example, a failure of the electrical system which drains the battery of a truck tractor may be costly not only because the truck tractor must be towed to another location and repaired, but also because time and perishable cargo may be lost. Consequently, the ability to predict, diagnose, and avoid such failures is desirable.

Mechanisms for avoiding such failure are disclosed in U.S. Pat. No. 5,871,858 by Thomsen et al. ("Thomsen") and U.S. Pat. No. 5,798,577 by Lesesky et al. ("Lesesky"). Thomsen and Lesesky treat one problem that has been diagnosed in devices such as a truck tractor, the problem of overcranking. Consequently, Thomsen discloses cutting off power to the cranking system of a truck tractor when the current flowing and time for which the current flows exceed a particular level. Similarly, Lesesky discloses cutting off power to the cranking system of a truck tractor when a user has provided a cranking signal for greater than a particular time. Furthermore, Thomsen treats the problem of theft using solid state switches controlled using a micro-computer and a code input by a user. Based on whether a code is provided to the system, whether the internal temperature of a switch is above a particular value, and whether a particular current has been provided for a particular time, Thomsen allows power to be provided to the cranking motor.

However, it would still be desirable to be capable of diagnosing impending failures, avoiding failures, providing power to consumers in a more optimal manner. Accordingly, what is needed is a system and method for providing intelligent power management. The present invention addresses such a need.

SUMMARY OF THE INVENTION

The present invention provides a method and system for managing power in a device having a power source. The power source includes a power storage unit capable of storing a particular amount of power. The device is capable of performing a plurality of functions using the power storage unit alone. The method and system comprise providing a plurality of switches, a plurality of signal inputs and at least one controller. The plurality of switches is coupled with the power source. Each of the plurality of switches is coupled with a portion of the device and thus can cut off power to that portion of the device. The plurality of signal inputs is for receiving information from the device. The at least one controller is coupled with the plurality of switches and the plurality of signal inputs. The at least one controller is for controlling the plurality of switches to be open or closed based on software provided to the at least one controller. The at least one controller is also capable of controlling the plurality of switches based upon the information provided by the plurality of signal inputs.

According to the method and system disclosed herein, power to various portions of the device can be controlled for a variety of reasons. As a result, power management, including the reliability and performance of the power supply, is improved. Furthermore, a variety of failures can be diagnosed and catastrophic failures prevented.

DETAILED DESCRIPTION OF THE INVENTION

The present invention relates to an improvement in power management technology, particularly for DC electrical power sources which may have limited capacity. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for managing power in a device having a power source. The power source includes a power storage unit capable of storing a particular amount of power. The device is capable of performing a plurality of functions using the power storage unit alone. The method and system comprise providing a plurality of switches, a plurality of signal inputs and at least one controller. The plurality of switches is coupled with the power source. Each of the plurality of switches is coupled with a portion of the device and thus can cut off power to that portion of the device. The plurality of signal inputs is for receiving information from the device. The at least one controller is coupled with the plurality of switches and the plurality of signal inputs. The at least one controller is for controlling the plurality of switches to be open or closed based on software provided to the at least one controller. The at least one controller is also capable of controlling the plurality of switches based upon the information provided by the plurality of signal inputs. As a result, performance and reliability of the power supply and the device itself can be enhanced.

Figure 16A:
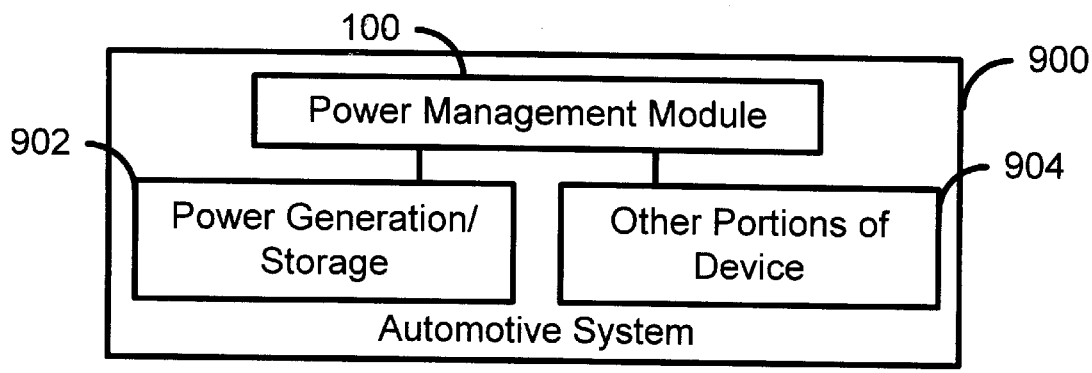
FIG. 16a depicts one embodiment of a power management system in accordance with the present invention as used in an automotive system.
Figure 16B:
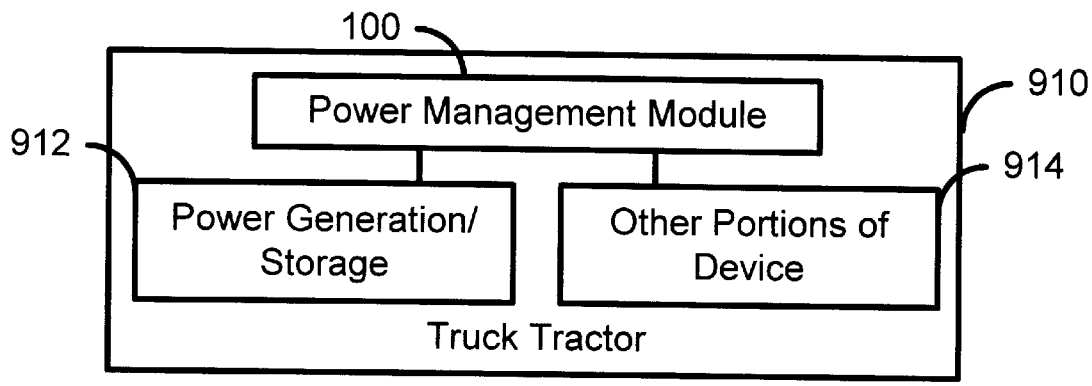
FIG. 16B depicts one embodiment of a power management system in accordance with the present invention as used in a truck tractor.
Figure 16C:
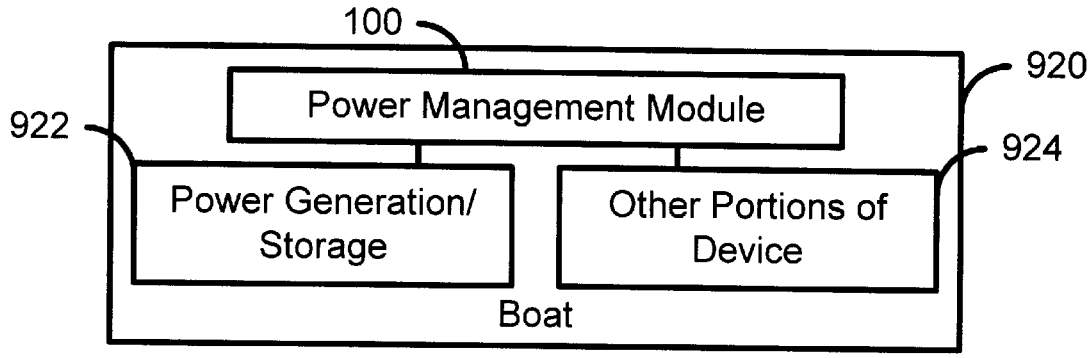
FIG. 16C depicts one embodiment of a power management system in accordance with the present invention as used in a boat.
Figure 16D:
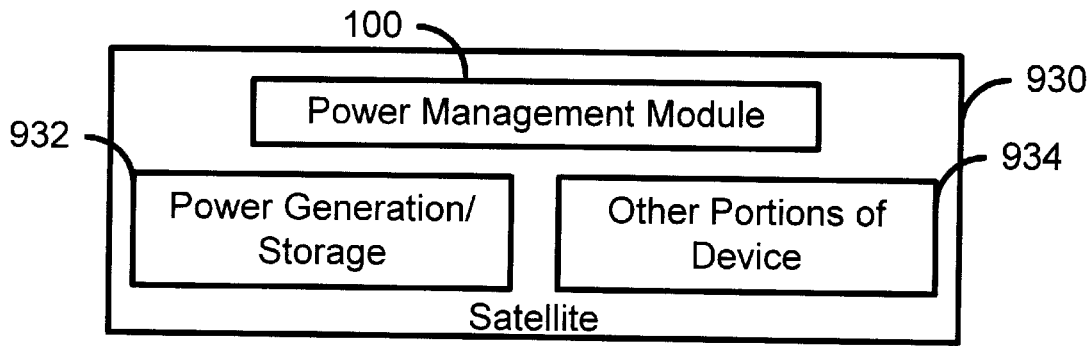
FIG. 16D depicts one embodiment of a power management system in accordance with the present invention as used in a satellite.

The present invention will be described in terms of a particular configuration and particular devices. However, one of ordinary skill in the art will readily recognize that this method and system will operate effectively for other configurations, including other connections with power sources and power consumers. Furthermore, one of ordinary skill in the art will readily recognize that the present invention can be used in a variety of other devices, such as satellites, boats, or other devices, as shown in FIGS. 16A (depicting one embodiment of a PMM 100 and an automotive system 900), 16B (depicting one embodiment of a PMM 100 and a truck tractor 910), 16C (depicting one embodiment of a PMM 100 and a boat 920) and 16D (depicting one embodiment of a PMM 100 and a satellite 930).

To more particularly illustrate the method and system in accordance with the present invention, refer now to 1A, which depicts a high-level block diagram of one embodiment of an intelligent power management system, or power management module ("PMM") 10 in accordance with the present invention. The PMM 10 depicted is essentially an intelligent switch which can be considered to include at least a controller 22 and switches 26. The controller 22 and switches 26 are preferably integrated together in a single module. The switches 26 are preferably solid state devices such as MOSFET switches. The controller 22 is preferably a programmable microcomputer. Thus, the controller 22 may be individually tailored for functions desired by a user of the PMM 10. The controller 22 can receive input signals in order to aid in controlling the switches 26. For example, the controller 22 can receive signals from a device with which the PMM 10 is being used or from internal sensors which may be coupled to one or more of the switches 26. The switches 26 are coupled with a power supply and a portion of the device, such as a subsystem. Thus, depending upon whether a particular switch 26 is closed, power may be provided to a subsystem of the device. Using the intelligence in the controller 22 and the switches 26, the PMM 10 can control the switching of power to portions of the device in which the PMM 10 is used. Thus, the PMM 10 can act as an intelligent switch. As a result, power management in the device can be improved.

Figure 1A:
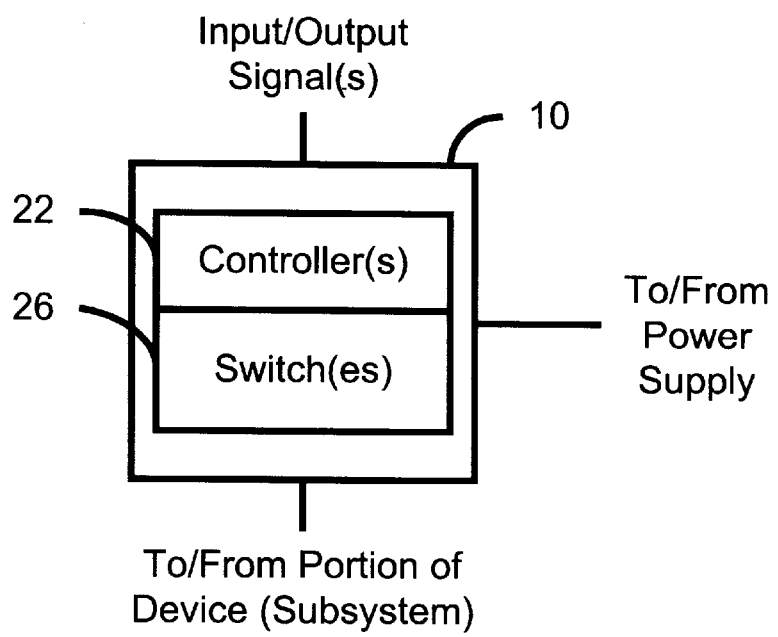
FIG. 1A is a high-level block diagram of one embodiment of an intelligent power management system in accordance with the present invention.
Figure 1B:
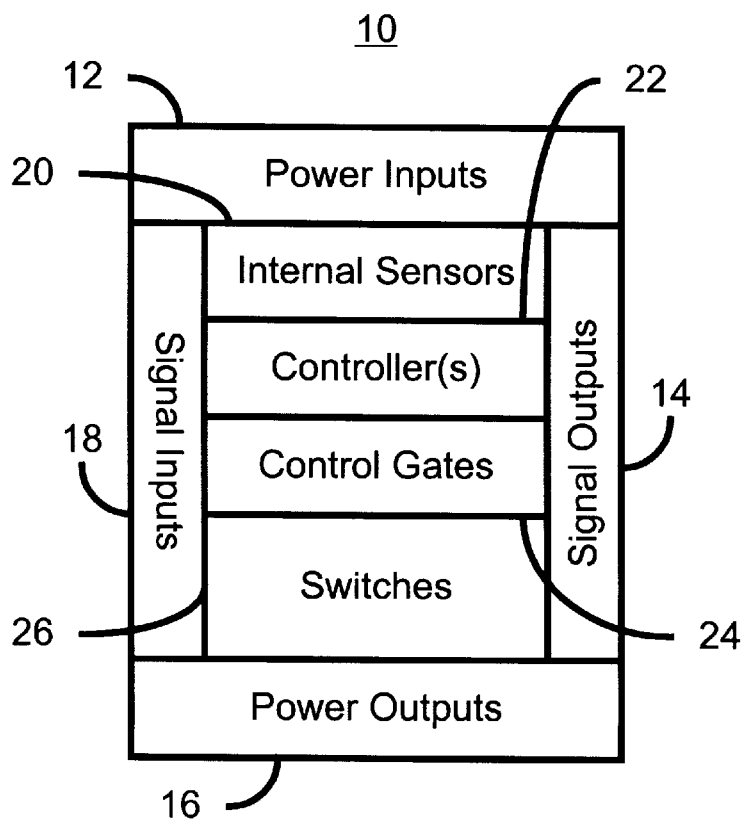
FIG. 1B is a block diagram of one embodiment of an intelligent power management system in accordance with the present invention.

FIG. 1B depicts a more detailed diagram of one embodiment of an intelligent power management system, or PMM 10, in accordance with the present invention. The PMM 10 includes power input 12, power output 16, signal inputs 18, signal outputs 14, internal sensors 20, a controller 22, switches 26 and, preferably, control gates 24 for the switches 26. The switches 26 are preferably devices such as MOSFET switches. The controller 22 is preferably a programmable microcomputer. Thus, the controller 22 may be individually tailored for functions desired by a user of the PMM 10. The controller 22 can communicate with portions of the device in which the PMM 10 is used via the signal input 18 and signal output 14. Thus, the controller can receive signals from a device with which the PMM 10 is being used through the signal input 18. Furthermore, the controller 22 can provide data and commands to the device through the signal output 14. The internal sensors 20 monitor the condition of the PMM 10. For example, the internal sensors 20 could include temperature sensors for various portions of the PMM 10, such as the switches 26, as well as current and voltage sensors for the switches 26. The internal sensors 20 may also include a timer, or clock, (not explicitly shown in FIG. 1B). In a preferred embodiment, the internal sensors 20 include temperature, voltage, and current sensors for each of the switches 26.

Figure 1C:
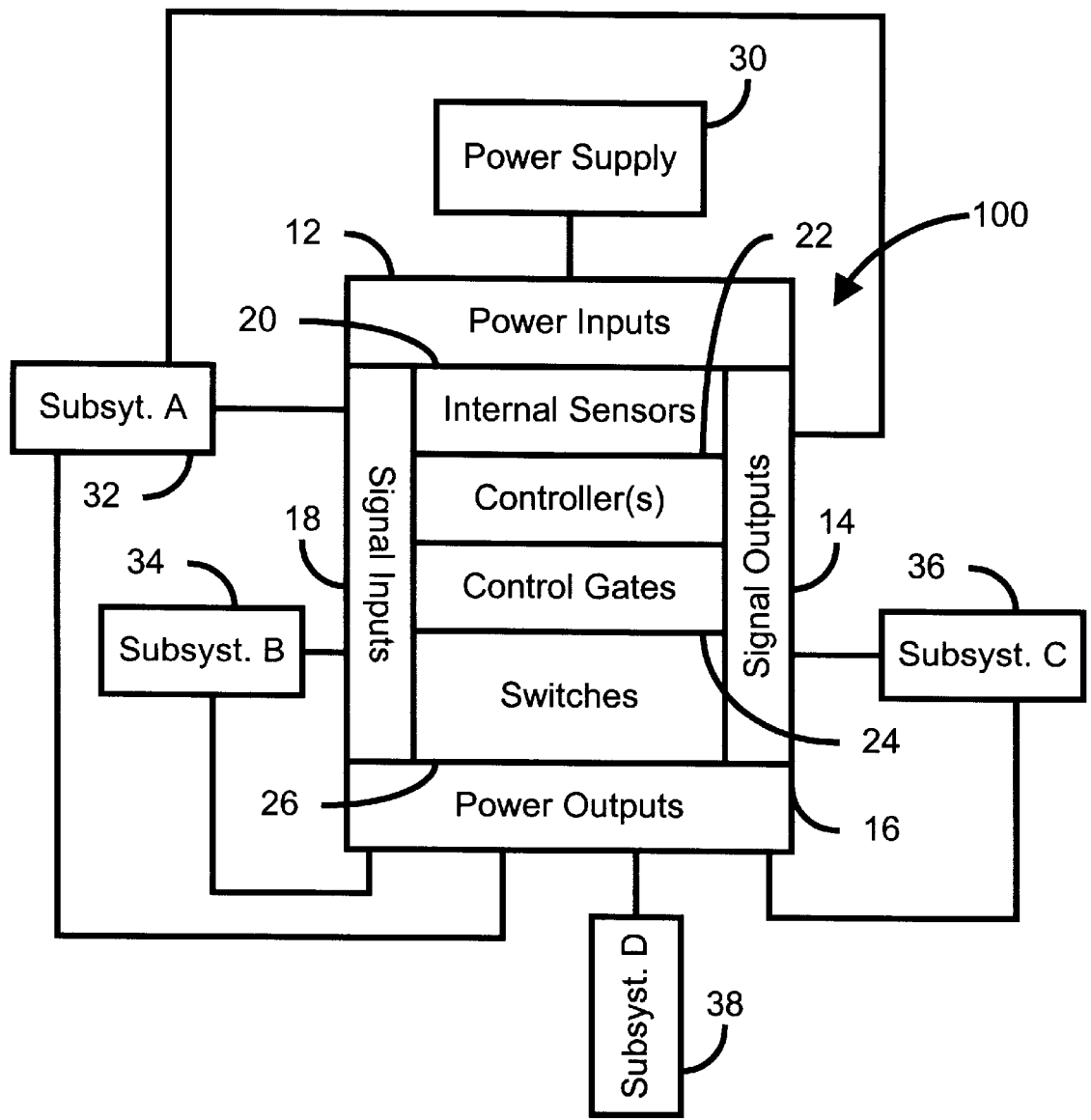
FIG. 1C is a block diagram of one embodiment of the intelligent power management system as coupled with a device.

FIG. 1C depicts an embodiment of the PMM 100 coupled with subsystems of a device. The PMM 100 is preferably the same as the PMM 10, though components are numbered differently. The PMM 100 still includes the signal input 18, the signal output 14, the power input 12, the power output 16, the internal sensors 20, the controller 22 and switches 26. The PMM 100 is coupled to a power supply 30 through the power input 12. The power supply 30 includes at least one or more power storage devices (not explicitly shown), such as a battery, and may also include power generating devices (not explicitly shown), such as one or more alternators. In a preferred embodiment, the PMM 100 is separately coupled to the alternator and battery. The PMM 100 receives signals from subsystem A 32 and subsystem B 34 through the signal input 18. The PMM 100 provides signals to subsystem A 32 and a subsystem C 36 using the signal output 14. The PMM 100 is also coupled to subsystem A 32, subsystem B 34, subsystem C 36 and subsystem D 38. The PMM 100 is capable of a variety of functions, including but not limited to one or more of the following: managing the generation and storage of power, monitoring and controlling power consumption, cutting off power to one or more consumers based on a variety of programmable factors, providing step down power conversion of the power supplied by the power source 30, providing protection against spikes, providing protection against shorts, providing reverse polarity protection, providing a self learning capability, learning the signatures of one or more subsystems, diagnosing potential failures based on the signatures of one or more subsystems, protecting against potential failures based on the signatures of one or more subsystems, and protecting against drainage of the power source 30.

Figure 1D:
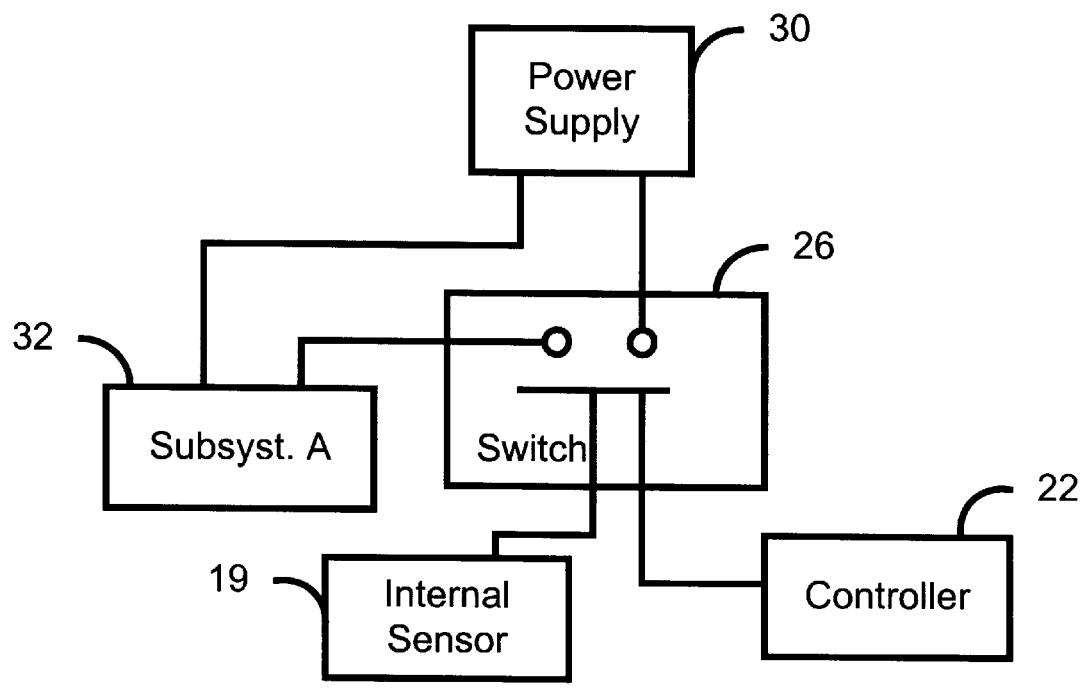
FIG. 1D is a block diagram of one embodiment of the intelligent power management system as coupled with a device.

FIG. 1D depicts one embodiment of a portion of the PMM 10 or 100 and the device to which the PMM 10 is coupled. The switch 26, which is one of the switches of the PMM 10, is connected between the power supply 30 of the device and the subsystem A 32 of the device. Consequently, when the switch 26 is open, as depicted in FIG. 1D, no power is provided to the subsystem A 32. However, when the switch 26 is closed, power is provided to the subsystem A 32. Also depicted are the controller 22 and internal sensor 19 coupled with the switch 26. Other or different components internal to the PMM 10 or 100 can be coupled with the switch 26. For example, in a preferred embodiment, current, voltage and temperature through the switch 26 are also monitored. The internal sensor 19 provides to the controller 22 an electrical signal indicating a property of one or more of the switches 26. Using the signal from the internal sensor 19 and/or other signals input to the controller 22 and based on the instructions provided to the controller 22, the controller 22 can control the switch to be open or closed. In addition to being simply open or closed, the switches 26 could be toggled to provide pulse width modulation. An example of this would be to limit in-rush current when the headlamp is turned on. Through pulse width modulation, the current is limited such that the level of current to the headlamp slowly and softly ramps up to the normal current level. The in-rush current is thus eliminated. Eliminating the in-rush current helps extend the headlamp life.

Figure 1E:
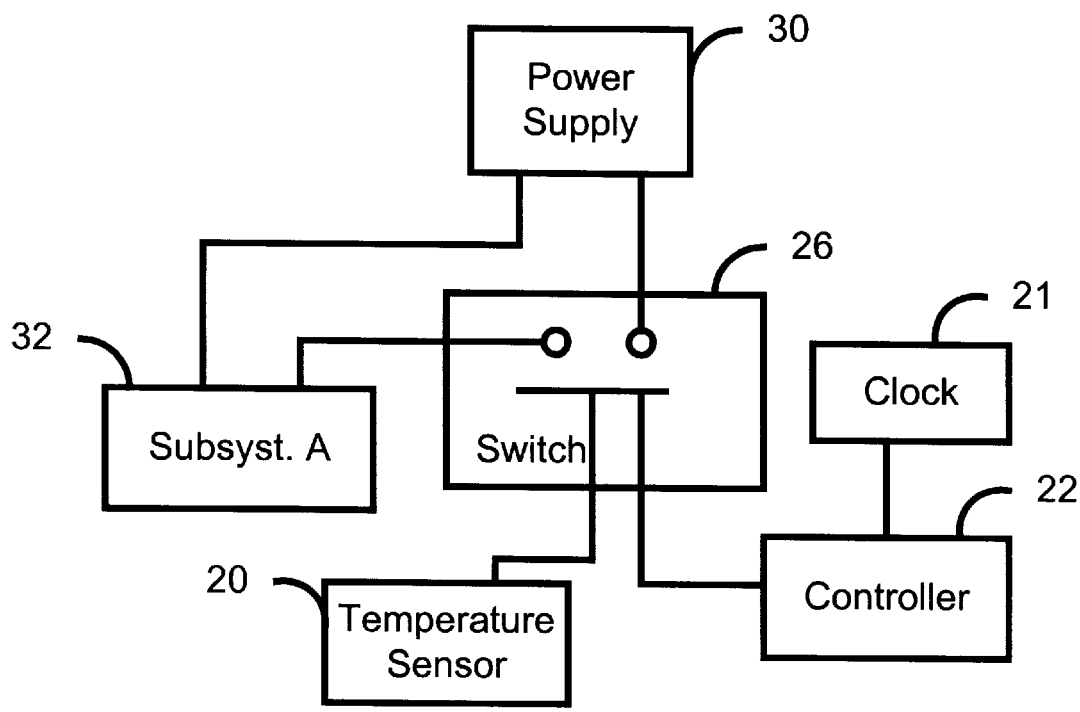
FIG. 1E is a block diagram of one embodiment of how a switch of the intelligent power management system is coupled with a portion of a device.

FIG. 1E depicts one embodiment of a portion of the PMM 10 or 100 and the device to which the PMM 10 or 100 is coupled. The switch 26, which is one of the switches of the PMM 10, is connected between the power supply 30 of the device and the subsystem A 32 of the device. Consequently, when the switch 26 is open, as depicted in FIG. 1E, no power is provided to the subsystem A 32. However, when the switch 26 is closed, power is provided to the subsystem A 32. Also depicted are the controller 22, temperature sensor 20 and clock 21 coupled with the switch 26. Other or different components internal to the PMM 10 or 100 can be coupled with the switch 26. For example, in a preferred embodiment, current and voltage through the switch 26 are also monitored. The temperature sensor 20 is thermally coupled with the switch 26 and coupled with the controller 22. Preferably, the temperature sensor 20 provides to the controller 22 an electrical signal indicating the temperature of the switch 26. The clock 21 is coupled to the controller 22 and can provide an indication of how long the switch 26 has been open or closed.

Figure 1F:
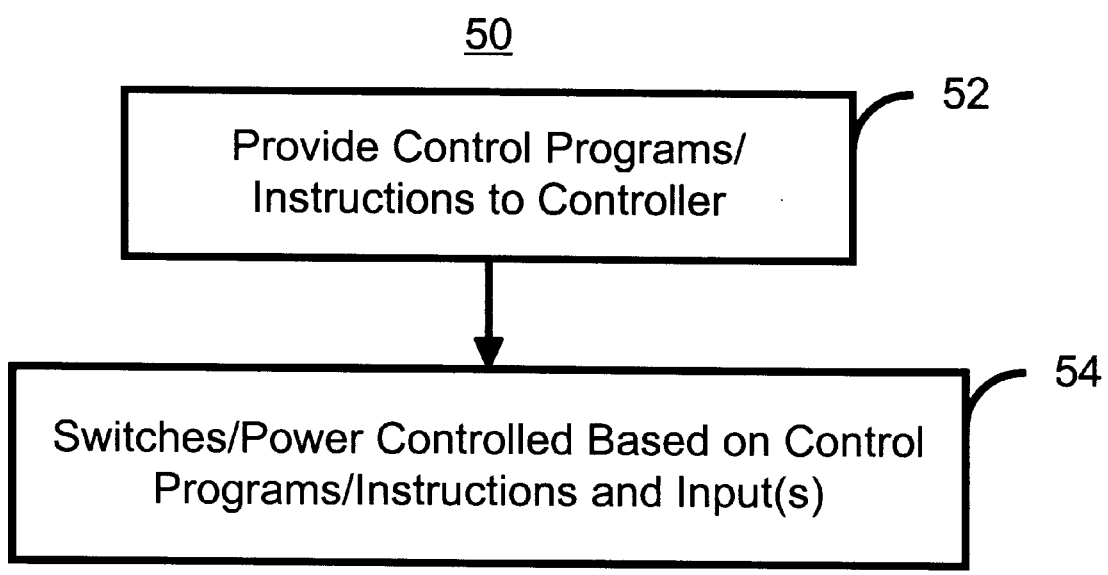
FIG. 1F is a high level flow chart of the functions of the power management module in accordance with the present invention.

FIG. 1F depicts a high-level flow chart of one embodiment of a method 50 for using the PMM 10 or 100 in accordance with the present invention. One or more control programs are provided to the controller 22, via step 52. The controller 22 then controls the power supplied to different power consumers based on the program and other inputs to the PMM 10 or 100, via step 54. Thus, the controller 22 opens or closes the switches 26 under certain conditions. The data provided by the internal sensors 20, an internal clock or information provided by the subsystems of the device that are connected to the signal input 18 inform the controller 22 as to the condition of the PMM 10 or 100 and the device to which the PMM 10 or 100 is connected. The PMM 10 or 100 can use this data with the instructions provided in the controller in order to determine when to open or close the switches 26. For example, the PMM 10 or 100 can determine whether the data meet certain criteria and operate the switches 26 accordingly.

To further illustrate the structure, functions, and capabilities of the present invention, reference will be made to the use of a PMM in the context of a particular device, a truck tractor. However, one of ordinary skill in the art will readily realize that analogous or functions may be provided by a PMM in other devices.

Figure 2A:
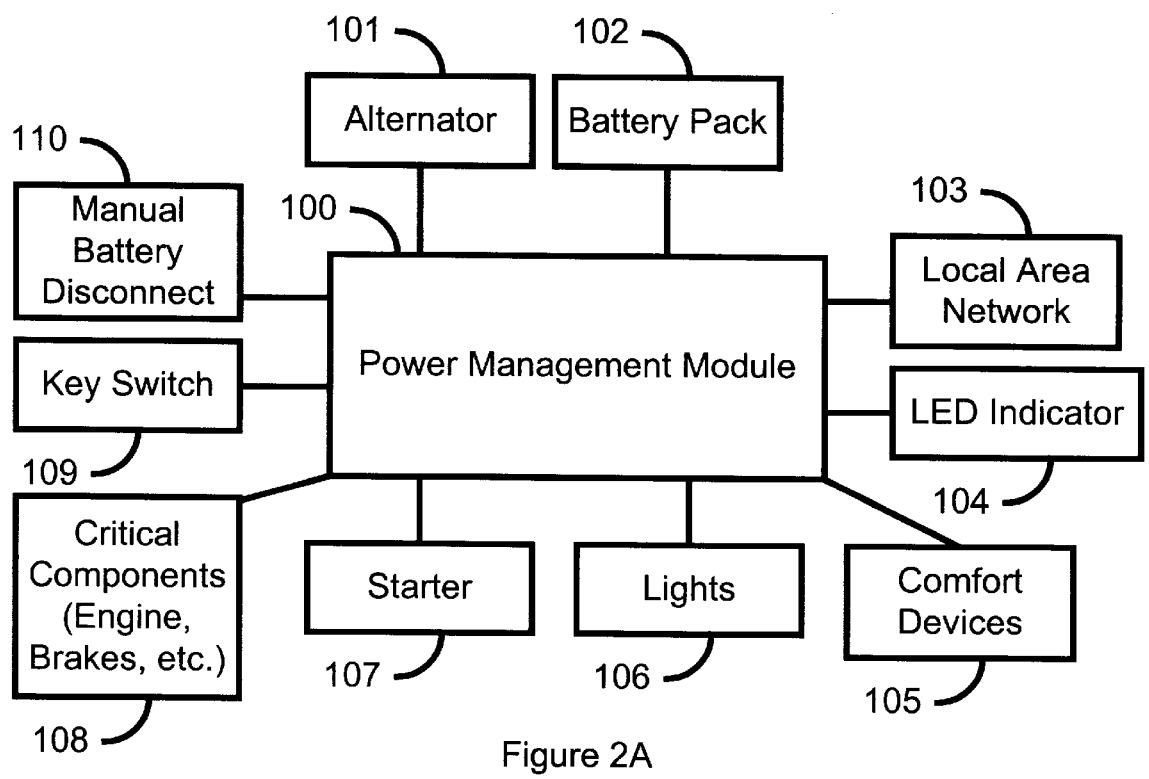
FIG. 2A is a high-level block diagram of one embodiment of a power management module in accordance with the present invention is used in a truck tractor.

FIG. 2A depicts a PMM 100 as it is coupled with subsystems in a truck tractor. Although numbered differently, components of the PMM 100 shown in FIG. 2A correspond to similarly named components in the PMM 10 shown in FIGS. 1A–E. Referring back to FIG. 2A, The truck tractor includes two power supplies, an alternator 101 which generates power and a battery pack 102 which stores power. The truck tractor also includes various subsystems such as a local area network 103, and LED indicator 104, comfort devices 105, lights 106, a starter 107, critical components 108, a start key switch 109 and a manual battery disconnect switch 110. The comfort devices 105 may include components such as a radio, refrigerator, or other devices. The critical components 108 include the engine, brakes, and other components.

Figure 2B:
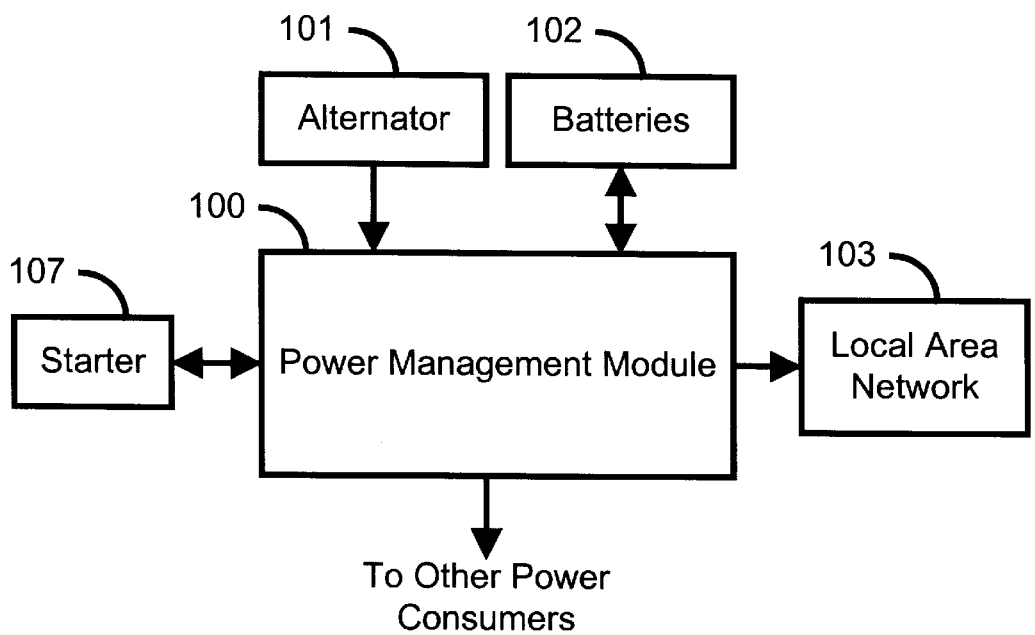
FIG. 2B is another high-level block diagram of one embodiment of a power management module in accordance with the present invention is used in a truck tractor.

FIG. 2B is another high-level diagram of the PMM 100 as coupled with certain subsystems in a device such as a truck tractor. The PMM 100 is depicted as being coupled to the batteries 102 and the alternator 101, the starter 107, other power consumers, and the LAN 103. Based on communication with the batteries 102, alternator 101, and various subsystems of the truck tractor, the PMM 100 can control switches (not explicitly shown in FIG. 2B) within the PMM 100 and can communicate with portions of the truck tractor so that a variety of functions are performed. These functions include but are not limited to those disclosed in the present application. As depicted in FIG. 2B, the PMM 100 may recognize differing power requirements for the batteries 102 under different conditions and determine the power drawn by the subsystems of the truck tractor. For example, the PMM 100 may recognize the ideal charge for the batteries 102 over a range of battery temperatures, battery capacity, and various requirements of the starter, such as voltage and current. The PMM 100 may also communicate with the batteries 102 to determine the remaining life in the batteries 102. Consequently, the PMM 100 may control other portions of the truck tractor and the power provided to the batteries 102 to meet the requirements of the batteries 102. Thus, the PMM 100 may ensure that the batteries 102 are charged close to the ideal level and may regulate power to power consumers to extend the life of the batteries 102 or ensure that the batteries 102 have sufficient power for critical applications. Consequently, the PMM 100 may identify and prevent potential failure of the batteries 102. The PMM 100 also receives signals from and provides signals to the alternator 101. Thus, potential failures of the alternator 101 or harm due to problems within the alternator 101 or other portions of the truck tractor may be prevented. The output of the alternator 101 may also be controlled based on signals provided from the PMM 100, for example to optimize battery power. In addition, switches between the alternator 101 and other portions of the truck tractor, including the batteries 102, may be provided. The PMM 100 may control these switches to provide the desired power to other portions of the truck tractor. Furthermore, the PMM 100 communicates with the starter (cranking) subsystem 107, identifying impending failure and preventing harm to the starter 107 due to system failure or user abuse. The power to the starter 107 may also be controlled based on other factors, such as the power remaining in the batteries 102 or the temperature of switches in the PMM 100. The PMM 100 also communicates with the LAN 103 for the truck tractor and other power consumers. Information relating to the status of the truck tractor may be communicated between the LAN 103 and the PMM 100. In addition to communicating with various other subsystems, the PMM 100 may control each subsystem's power consumption. For example, the PMM 100 may cut off power to the subsystems or reduce power to the subsystem. The PMM 100 may also control power to the subsystems to ensure that power in the batteries 102 or alternator 101 exists for critical needs and to ensure that the subsystems receive the appropriate amount of power. The PMM 100 may also monitor the subsystems to prevent harm from short circuits, spikes, or failures. The PMM 100 can also control and regulate power output to power sensitive devices, such as light bulbs.

Figure 3:
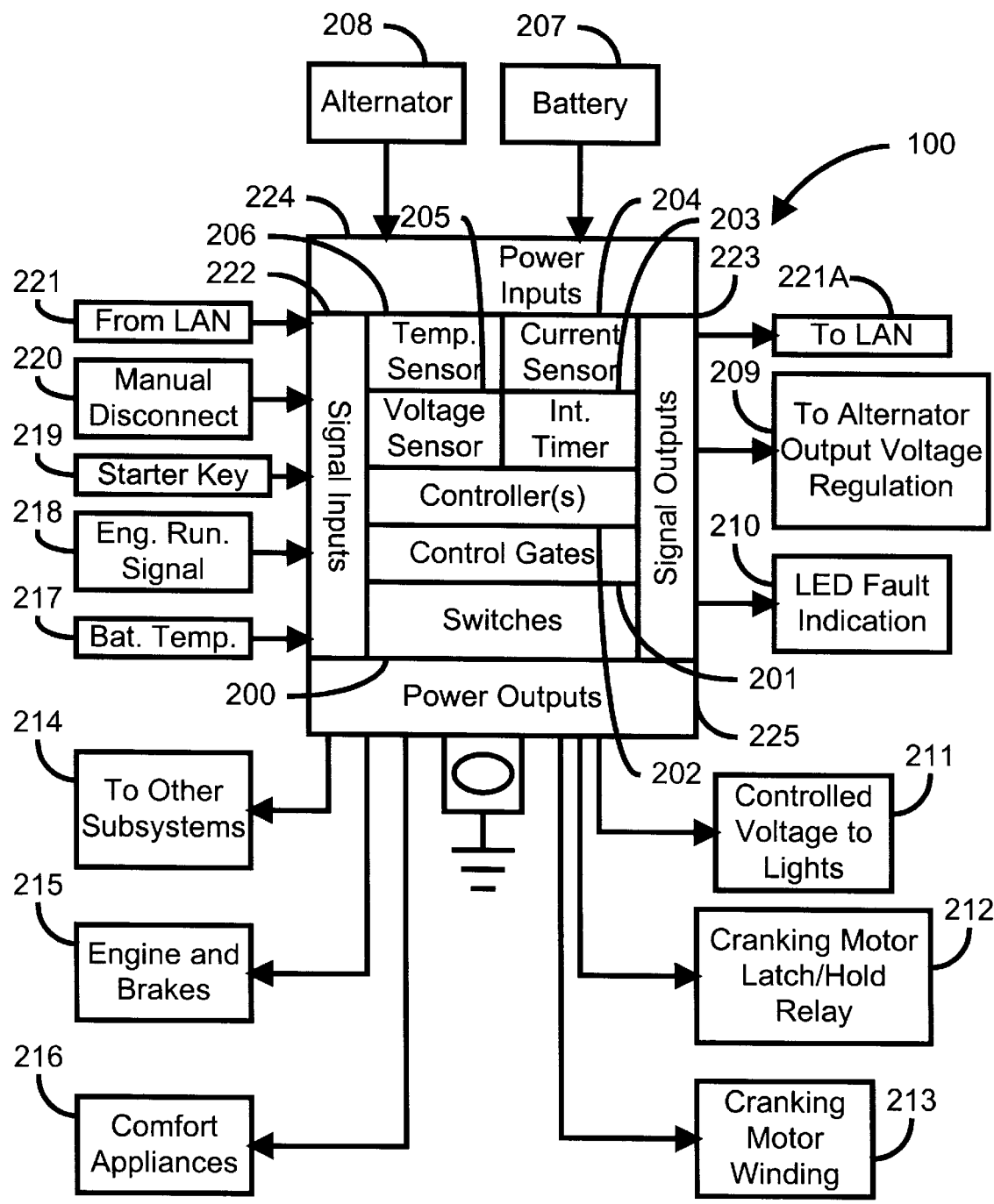
FIG. 3 is a more detailed block diagram of one embodiment of a power management module in accordance with the present invention is used in a truck tractor.

FIG. 3 more particularly illustrates the connections between the PMM 100 and subsystems of the truck tractor.

Although numbered differently, components of the PMM 100 shown in FIG. 3 correspond to similarly named components in the PMM 100 shown in FIG. 2A. Referring back to FIG. 3, the PMM 100 includes signal inputs 222, signal outputs 223, power inputs 224 and power outputs 225. The PMM 100 also includes MOSFET switches 200, control gates 201 and a controller 202. The control gates 201 control the switches 200. The controller 202 controls the control gates 201 and, therefore, controls the switches 200. The controller 202 is preferably a programmable microcomputer. The PMM 100 also includes an internal timer 203, current sensors 204, voltage sensors 205 and temperature sensors 206. The current sensors 204, voltage sensor 205, and temperature sensors 206 monitor the current through, voltage across and temperature of, respectively, the switches 200. Preferably each of the switches 200 includes a current sensor 204, a voltage sensor 205, and a temperature sensor 206. In addition, the PMM 100 includes components for monitoring various portions of the truck tractor. For example, the PMM 100 may monitor the voltage across and current through certain power consumers and may monitor the charge level, rate of charge and rate of discharge of the battery 207.

The PMM 100 is coupled to two power supplies, battery 207 and the alternator 208. The PMM 100 receives signals from a local area network (LAN) line 221, a manual disconnect line 220, a starter key line 219, an engine running signal line 218, and a battery temperature sensor line 217 provided from a LAN (not shown), a manual disconnect switch (not shown), a starter key (not shown), an sensor indicating whether the engine is running (not shown) and a battery temperature sensor (not shown), respectively. The PMM 100 provides signals to a LAN, the alternator 208, and an LED via a communication to LAN line 221A, an input to alternator output voltage regulation line 209, and an LED fault indication line 210, respectively. Consequently, the PMM 100 can receive data from, provide data to, and provide commands to different subsystems of the truck tractor. For example, the manual disconnect line 220 indicates whether the battery 207 and alternator 208 should be cut off by the PMM 100. The starter key line 219 indicates whether a user has turned a starter key to start up the engine of the truck tractor. The engine running signal line 218 indicates to the PMM 100 whether the engine is already running, allowing the PMM 100 to prevent power from flowing to the cranking subsystem when the engine is already on. The PMM 100 can monitor the temperature of the battery via line 217, and can monitor the voltage across the battery 207, for example to control charging of the battery 207. Furthermore, the PMM 100 can control output of the alternator 208 through the input to alternator output voltage regulation line 209. The PMM 100 can also indicate to the user if a fault has occurred via LED fault indication line 210. The temperature sensors 206 provide an indication of the temperature of the switches 200. This allows the controller to open one or more of the switches when their temperature is too high.

A typical alternator, such as the alternator 208, is three-phase alternating current generator. The rectifier circuit (not shown) in the alternator 208 converts alternating current (AC) to direct current (DC). Important components in the rectifier are diodes. When a diode or other component fails in one phase of the alternator 208, the alternator 208 will generate only two-thirds of the power. This will put significant stress on the two working phases of the alternator 208. This leads to quick and progressive failure of all phases of the alternator 208. Currently, conventional devices in the market place cannot detect the loss of a phase and prevent the rapid and eminent failure of the other phases. The PMM 100 can detect the loss of a phase through alternator signature recognition. In response, the PMM 100 can reduce the demand on the alternator 208. This will give time to fix the alternator at the next scheduled maintenance rather failing unexpectedly on a high way where the maintenance and downtime costs are excessive.

The alternator 208 has both stator and rotor windings. Any one of these windings can develop electrical short or open condition. When shorted or open condition develops, the alternator 208 will generate reduced electrical power. This will put significant stress on windings that are normal. Progressive failure of other components rapidly follows. Currently no conventional devices detect a short or open condition to prevent the failure of other components. The PMM 100 can detect the loss of a phase through alternator signature recognition, and reduces the demand on alternator 208. This will give time to fix the alternator 208 at the next scheduled maintenance rather failing unexpectedly, resulting in excessive maintenance and downtime costs.

Furthermore the PMM can detect and account for the failure of the belt and pulley system driving the alternator. When the belt or pulley slips, the alternator cannot generate power that it is designed to generate. The slip condition heats up the belt, pulley, alternator bearings and other portions of the truck tractor. The PMM 100 can detect the existence of these conditions, using communication with the truck tractor and monitoring the difference between the behavior of the alternator and its signature. PMM can then take appropriate action, for example by providing an alarm to the user.

The PMM 100 can also monitor the power consumers and supplies. Thus, the PMM 100 is coupled with several subsystems that act as power consumers. For example, the PMM 100 is coupled with the lights, a cranking motor latch/hold coil, a cranking motor winding, other devices in the truck tractor, the engine and brakes, and comfort appliances via the lights line 211, a cranking motor latch/hold coil line 212, a cranking motor winding line 213, other devices in the truck tractor line 214, engine and brakes line 215, and comfort appliances line 216. Thus, in the embodiment shown in FIG. 3, the PMM 100 is coupled to the cranking subsystem through two lines 212 and 213. Using the lines 211, 212, 213, 214, 215, and 216, the PMM 100 can monitor and control power to various subsystems of the truck tractor, such as the lights, components of the cranking subsystem, the engine and brakes, comfort appliances, and other subsystems. For example, the PMM 100 can provide pulse width modulation (PWM) to control the magnitude of the power supplied to a particular subsystem. Thus, the voltage applied to the lights, the engine, and the brakes can be decreased as desired to extend the life of or better control components. The PMM 100 can also monitor and regulate the demand on the alternator, preferably by using PWM. For example, when the engine is started when the whether is cold, the battery charge is low and the power use is high, the electrical system will try to draw as much current as possible from the alternator 208 instantaneously. This condition puts high stress on and reduces the life of the alternator 208. The PMM 100 monitors and regulates the demand on the alternator 208 such that the stress on alternator is moderated and maintained at an optimum level. This is accomplished through PWM of alternator output.

The PMM 100 is also capable of keeping track of these information for various components such as starter (cranking subsystem), battery 207, alternator 208, light bulbs and others subsystems. Knowing the cycles and severity of operation is the accurate way of knowing the actual usage of these components. By knowing this, most optimum maintenance schedule can be used. This will avoid servicing or changing components before its time. This will also help to avoid not serving or changing components when it is time.

FIGS. 4–15 more particularly describe some of the uses of the PMM 10 or 100. For clarity, many of the FIGS. 4–15 are described using the PMM 100 as employed in a truck tractor. However, one of ordinary skill in the art will recognize that the methods and systems described in FIGS. 4–15 can be used with other embodiments of the PMM. One of ordinary skill in the art will also realize that the methods and systems described in FIGS. 4–15 can be used in other devices which may operate using a limited power supply, such as a battery or other power storage unit that stores a particular amount of power. For example, the methods and systems described in FIGS. 4–15 may be used for a PMM in a boat or satellite.

Figure 4:
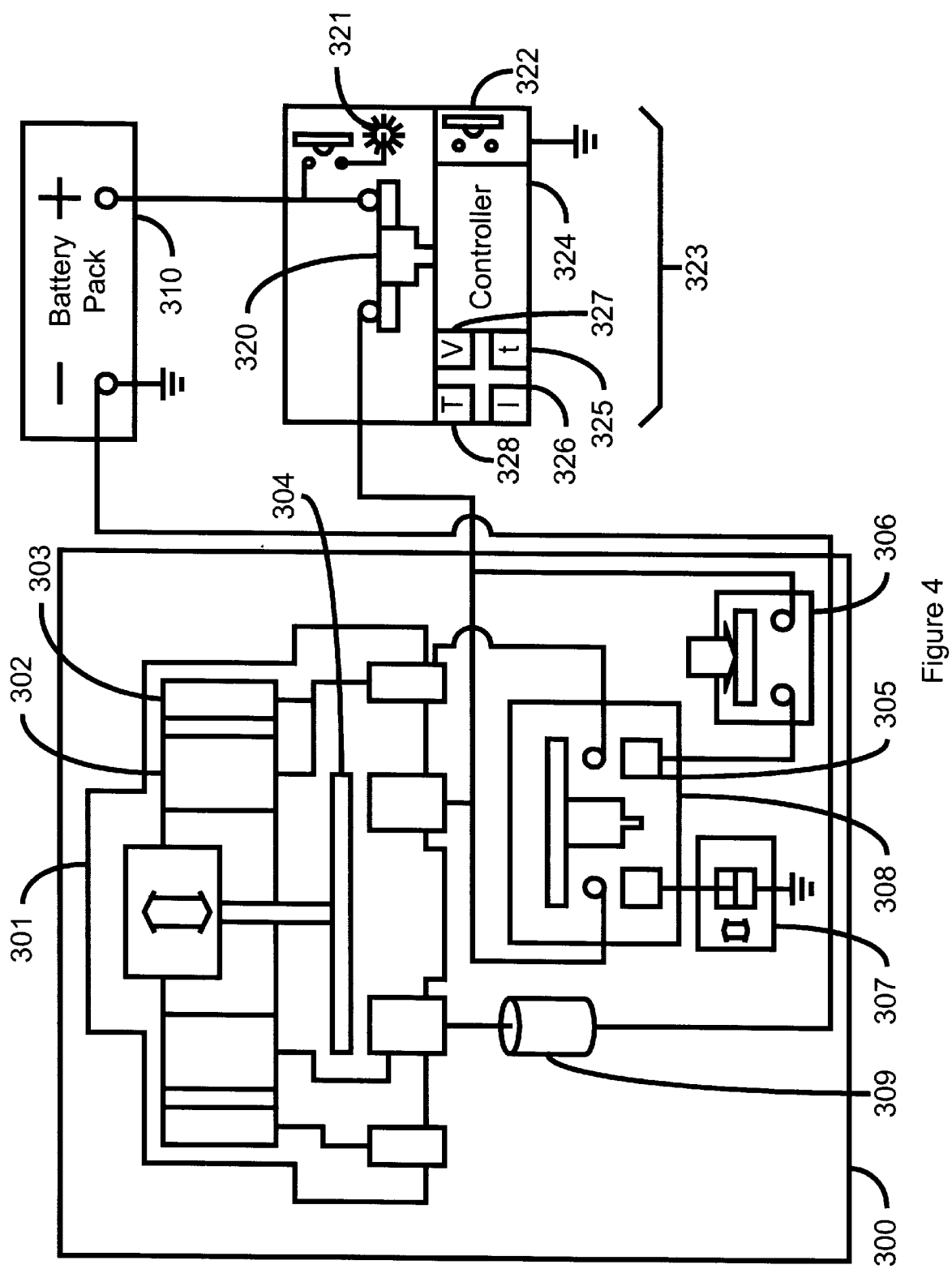
FIG. 4 is a diagram of one embodiment of how the power management module in accordance with the present invention can be used for auto-disconnect to protect against overcranking.

FIG. 4 depicts one embodiment of a system for controlling overcranking using the PMM 100. For clarity, only a portion of the PMM 100 is depicted in FIG. 4. Overcranking protection is desirable for a variety of reasons. Shorting of the main contacts 304 of the cranking subsystem 300 could cause a fire. Similarly, continued overcranking by a user could drain the battery pack 310 and cause damage to the truck tractor. Thus, a portion of the PMM 100 is shown in conjunction with a battery pack 310 and a portion of the cranking subsystem 300. The portion of the PMM 100 is indicated as the INTRA smart switch 323. Although numbered differently, components of the smart switch 323 correspond to similarly named components in the PMM 100. The smart switch 323 includes the controller 324, the switch 320, timer 325, current sensor 326, voltage sensor 327, temperature sensor 328, and an LED 321 to indicate whether the switch 320 is open. The switch 320 is coupled to the positive terminal of the battery pack 310, while the negative terminal of the battery pack 310 is connected to the cranking subsystem 300. Note that the switch 323 could be coupled between the negative terminal of the battery pack 310 and the cranking subsystem 300, rather than between the positive terminal and the cranking subsystem 300. The cranking subsystem 300 includes the starter solenoid 301, the pull-in winding 302, the hold-in winding 303, main contacts 304, a starter magnetic switch coil 305, the a start switch 306, a thermal switch 307, a magnetic switch 308, and motor windings 309. The pull-in windings 302 and hold-in windings 303 control the pulling and holding in of the starter motor gear (not shown) with the gears of the engine. The start switch 306, which is normally open, is closed only when a user attempts to start the truck tractor.

When the start switch 306 is closed, the controller 324 may close the switch 320. The controller 324 may impose conditions other than the start switch 306 being closed for the switch 320 to close. For example, the controller may only close the switch if there is a minimum voltage level of the battery 310 or a particular temperature of the switch 320 that is less than a particular level. Thus, the controller 324 uses instructions provided, as described in FIGS. 1F and 6A–C, to determine whether certain conditions are met and control the switch accordingly. When the switch 320 is closed, the positive terminal of the battery 310 is connected to the magnetic switch 308 which controls power to the main contacts 304, the pull-in winding 302 and the hold-in winding 303. Closing of the switch 320 also allows power to be provided to the main contacts 304. The magnetic switch 308 closes, allowing power to flow to the pull-in winding 302 and the hold-in winding 303. The pull-in winding 302 then pulls the front gear of the starter motor (not shown) to the engine's front gear (not shown). The hold-in winding 303 then holds the starter motor front gear in position. The main contacts 304 close when the starter motor's front gear is engaged with the engine's front gear. Power to the pull-in windings 302 is then cut, while power is applied to the hold-in windings 303 and the motor windings 309.

Based on certain criteria, the controller 324 may not close the switch 320. Thus, no power will be provided to the cranking subsystem 300 and cranking will be prevented. Furthermore, based on some criteria, the controller 324 may open the switch 320, automatically disconnecting power to the cranking subsystem 300. As a result, cranking will be stopped. The criteria used for refusing to close the switch and the criteria used for opening the switch may be programmed into the controller 324. In a preferred embodiment, the criteria include providing a particular current to the cranking subsystem 300 for more than a particular amount of time; the temperature, voltage or current through the switch 320 exceeding particular thresholds, and the battery pack 310 having a voltage that is below a particular level. Thus, if power through the main contacts 304 is larger than desired, for example because the main contacts 304 are becoming welded, the switch 320 can be opened. Also in a preferred embodiment, the PMM 100 will open the switch 320 when the behavior of the cranking subsystem 300 deviates from an expected behavior by a certain amount. Furthermore, the PMM 100 could control the switch 320 based on other criteria, such as signals input to the PMM 100 from the engine or other portion of the truck tractor.

Figure 5:
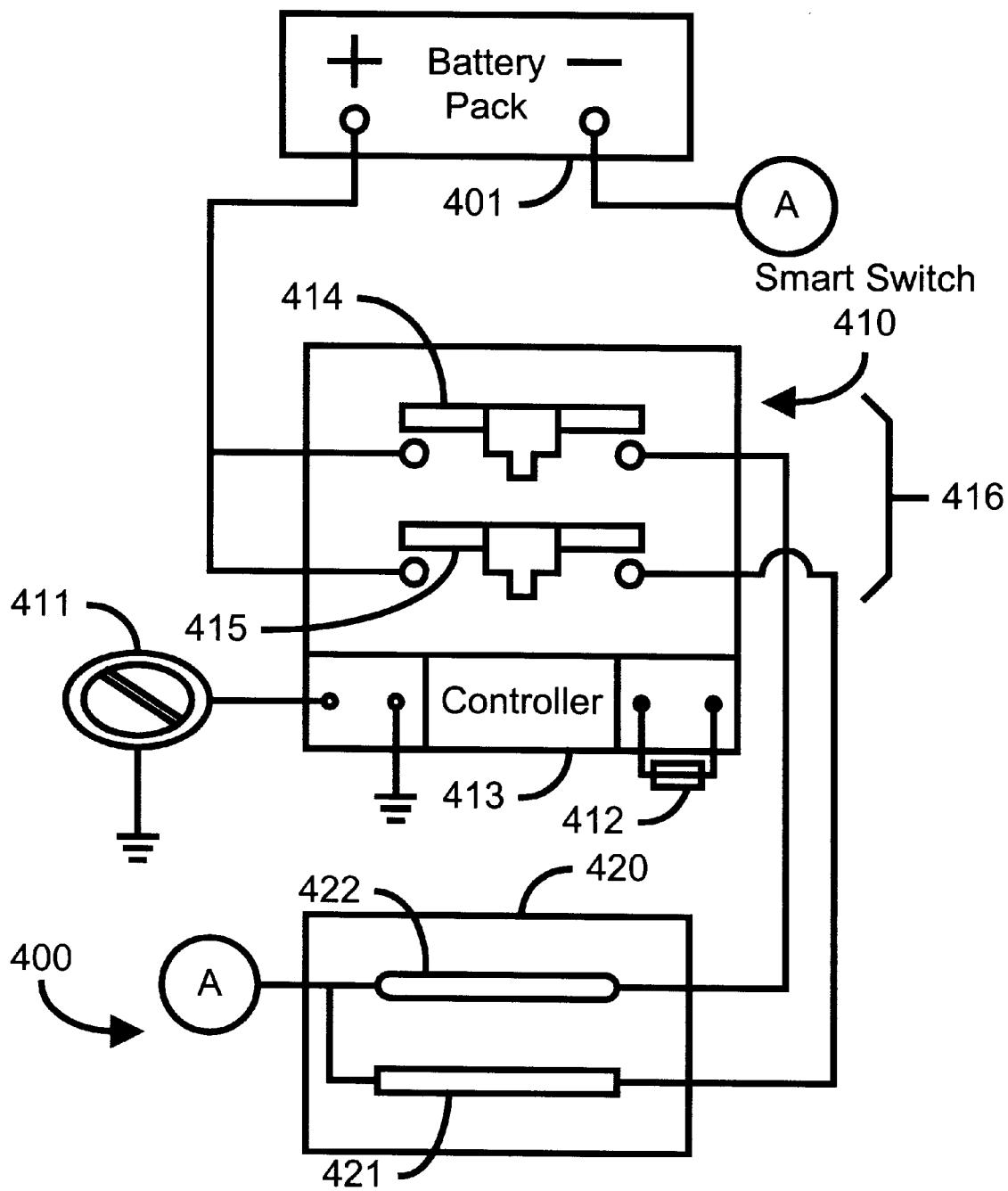
FIG. 5 is a diagram of another embodiment of how the power management module in accordance with the present invention can be used for auto-disconnect to protect against overcranking.

FIG. 5 depicts another embodiment of a system for controlling overcranking using the PMM 100. Thus, a portion of the PMM 100 is sown in conjunction with a battery pack 401 and a portion of the cranking subsystem 400. The portion of the PMM 100 is indicated as the INTRA smart switch 410. Although numbered differently, components of the smart switch 410 correspond to similarly named components in the PMM 100. The smart switch 410 includes the controller 413, the motor coil power switch 415 and a relay latch and hold coil switch 414 (collectively referred to as switches 416) and receives inputs indicating whether the engine is running and whether the start switch has been turned via lines 412 and 411, respectively. The switches 416 are coupled to the positive terminal of the battery pack 401, while the negative terminal, or ground, of the battery back 401 can be viewed as being connected to the cranking subsystem 400. Note, however, that the switches 416 could be coupled between the negative terminal of the battery pack 401 and the cranking subsystem 400, rather than between the positive terminal and the cranking subsystem 400. The portion of the cranking subsystem 400 shown is a single latch (pull-in) and hold coil winding 422 and a motor coil winding 421. Other components of the cranking subsystem 400 are not depicted for clarity.

The embodiment shown in FIG. 5 allows the single latch and hold coil winding 422 to replace the hold-in winding 303 of the cranking subsystem 300 depicted in FIG. 4. Referring back to FIG. 5, when the start switch is closed, the controller 413 may close the switches 416. The controller 413 may impose conditions other than the start switch being closed for the switches 416 to close. For example, the controller may only close the switch if there is a minimum voltage level of the battery 401 or particular temperatures of the switches 316 that are less than particular levels. The criteria used in controlling the switches are preferably programmed at or around the time the instructions are provided to the controller. Preferably, the relay latch and hold coil switch 414 is closed first. When the relay latch and hold coil switch 414 is closed, the positive terminal of the battery 401 is connected to the single latch and hold coil winding 422. The single latch and hold coil winding 422 then pulls the front gear of the starter motor (not shown) to the engine's front gear (not shown) and holds the starter motor front gear in position. In a preferred embodiment, the power to the single latch and hold coil winding 422 is reduced when the starter motor's front gear is engaged with the engine's front gear. This is because it takes less power to hold the starter motor's front gear in place than to pull the front gear into place. This reduction in power can be accomplished using pulse width modulation, or opening and closing the switch 414 at a rate which results in reduced power of the desired magnitude being provided to the single latch and hold coil winding 422. The motor coil power switch 415 is also closed, allowing current to flow to the motor coil winding 421 and the cranking subsystem 400 to crank the engine.

Based on certain criteria, the controller 413 may not close one or more of the switches 416. Thus, no power will be provided to the cranking subsystem 400 and cranking will be prevented. Furthermore, based on some criteria, the controller 413 may open the one or more of the switches 416, automatically disconnecting power to the cranking subsystem 400. As a result, cranking will be stopped. The criteria used for refusing to close the switches 416 and the criteria used for opening the switches 416 may be programmed into the controller 413. In a preferred embodiment, the criteria include providing a particular current to the cranking subsystem 400 for more than a particular amount of time; the temperature, voltage or current through one or more of the switches 416 exceeding particular thresholds, and the battery pack 401 having a voltage that is below a particular level. Also in a preferred embodiment, the PMM 100 will open the switches 416 when the behavior of the cranking subsystem 400 deviates from an expected behavior by a certain amount. Furthermore, the PMM 100 could control one or more of the switches 416 based on other criteria, such as signals input to the PMM 100 from the engine or other portion of the truck tractor.

Because the switches 416 control current to the motor coil winding 421 and the single latch and hold coil windings 422, the main contacts 304, the hold-in winding 303, the magnetic switch 308 and the thermostat 307 shown in FIG. 4 may be eliminated. The main contacts 304 can be eliminated because the motor coil power switch 415 is used to control current to the motor coil winding 421. The hold-in windings 303 can be eliminated because the controller 413 controls the relay latch and hold coil switch 414 to provide PWM. In other words, the controller 413 controls the relay latch and hold coil switch 414 to open and close at a desired rate, which results in PWM. PWM steps down the power provided to the single latch and hold coil windings 422. Thus, the single latch and hold coil winding 422 can be used to engage the starter motor's front gear, which requires a certain amount of power, and to hold the starter motor's front gear in place, which requires less power, without overheating.

Figure 6A:
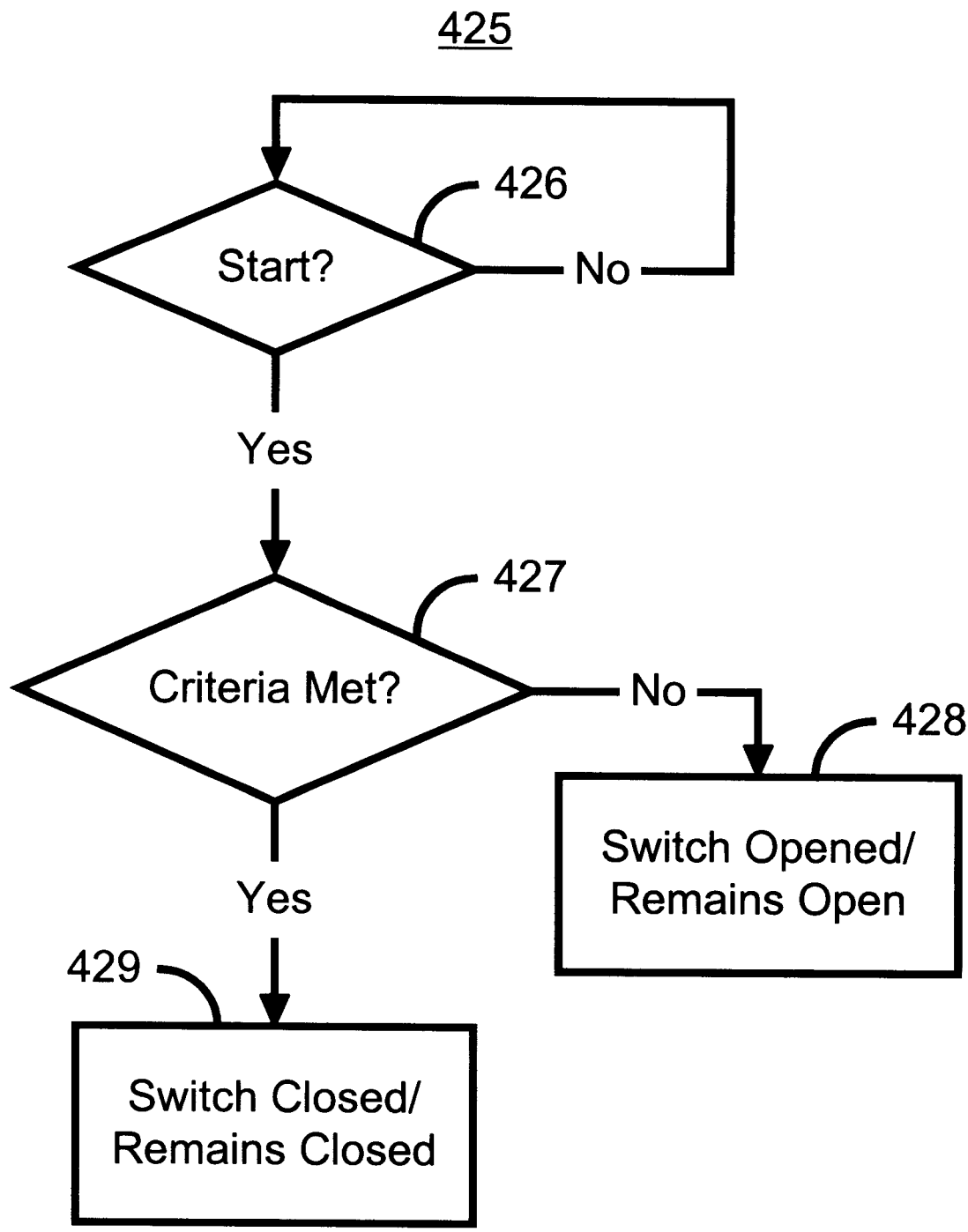
FIG. 6A is a high-level flow chart depicting one embodiment of a method for providing protection against overcranking using the power management module in accordance with the present invention.

FIG. 6A depicts a high-level flow chart of one embodiment of a method 425 in accordance with the present invention for controlling power to the cranking subsystem. It is determined whether the truck tractor is to be started, via step 426. In one embodiment, step 426 includes determining whether the start switch 306 has been closed, indicating that power is desired to be supplied to the cranking subsystem 300. If the truck tractor is not to be started, then nothing happens. Thus, step 426 may be repeated. If, however, the truck tractor is to be started, then it is determined whether the desired criteria have been met, via step 427. Step 426 is preferably performed by the controller 324 and may utilize information provided to the controller from the PMM 100 itself or from portions of the truck tractor. For example, the criteria in step 427 could include one or more of the following: whether the temperature of the switch in the PMM 100 is less than a particular temperature; determining whether the voltage and or current through the switch or the cranking subsystem meet or exceed certain values, whether the engine is already running or other criteria such as those discussed with respect to FIGS. 6B–C, below. The criteria are preferably programmed into the controller before or when the PMM is placed in the truck tractor. Referring back to FIG. 6A, if it is determined that the criteria are not met, then the switch is opened or allowed to remain open, via step 428. Thus, power is cut off from or not allowed to flow to the cranking subsystem. If, however, the criteria are met, then the switch is closed or allowed to remain closed, via step 429. Thus, power is provided to or allowed to continue to flow through the cranking subsystem.

Figure 6B:
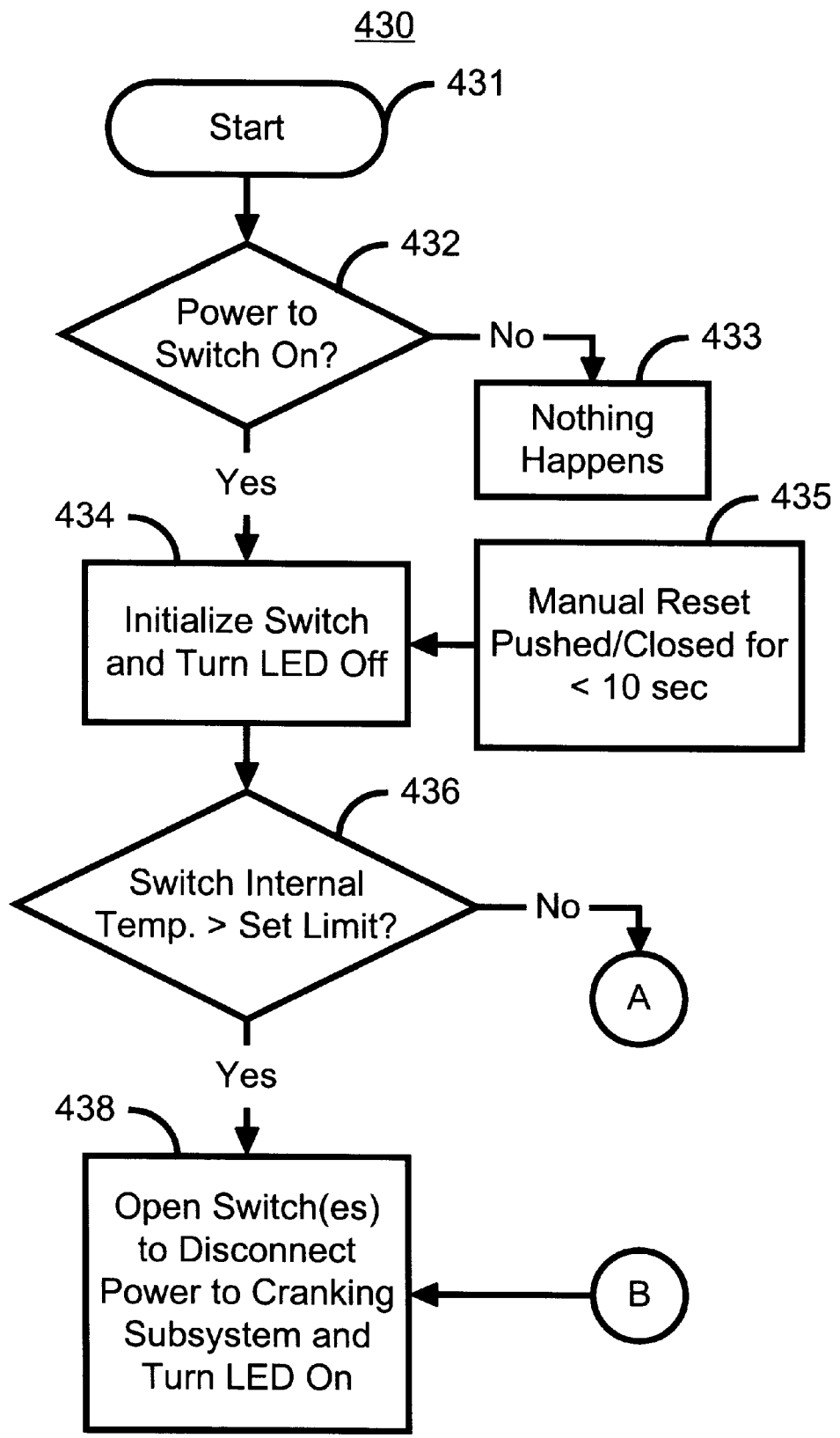
FIGS. 6B–C are a flow chart depicting one embodiment of a method for providing protection against overcranking using the power management module in accordance with the present invention.
Figure 6C:
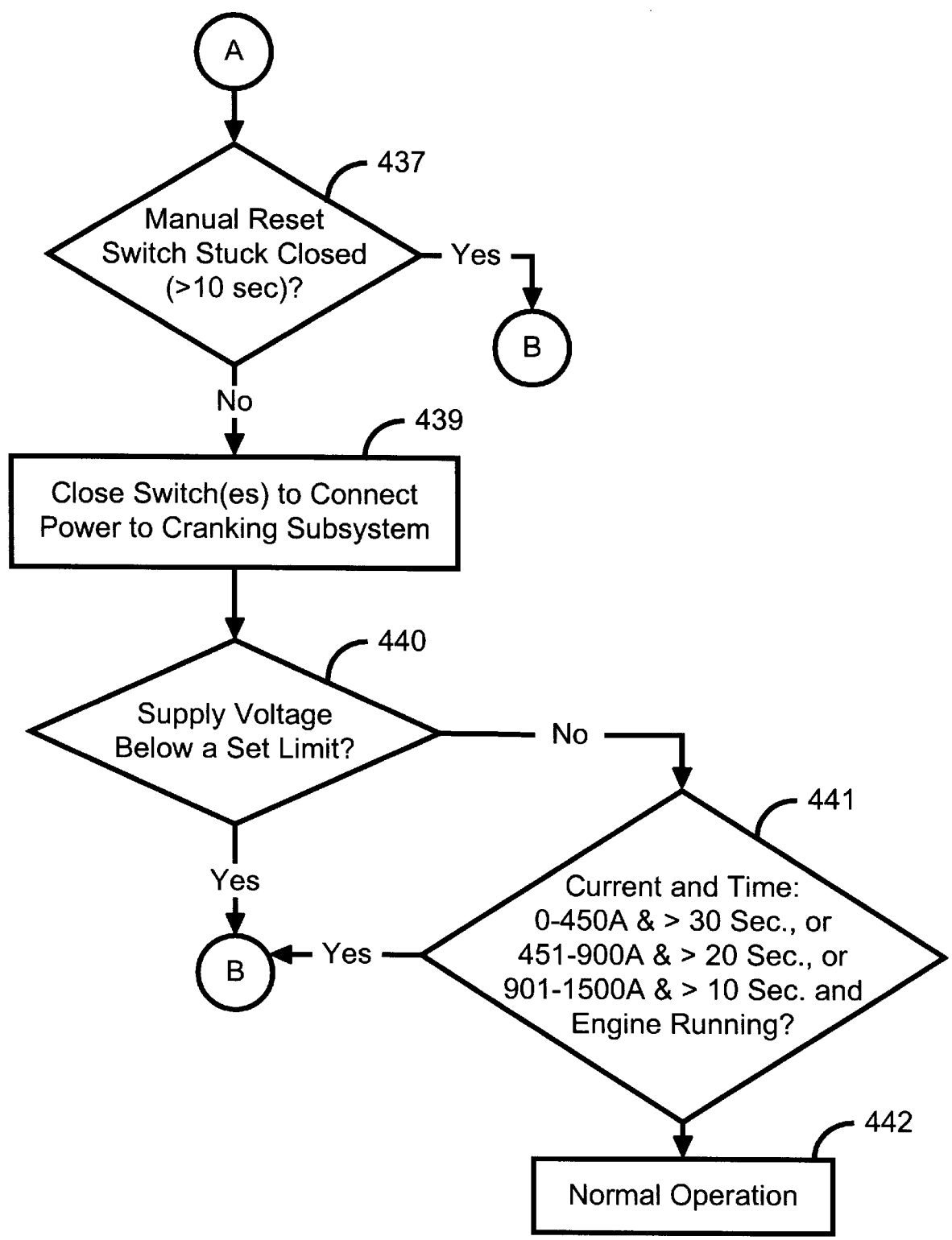

FIGS. 6B–C depict a more detailed flow chart of one embodiment of a method 430 for controlling overcranking in accordance with the present invention. The method 430 is preferably used by the PMM 100 when connected as depicted in FIG. 4. However, the method 430 can be adapted for use in another system, such as the systems shown in FIG. 5 and FIG. 7. Referring FIGS. 6B–C and 4, the method starts at 431. It is determined whether there is power to the switch, or the PMM 100, via step 432. If the PMM 100 does not have power, the switches within the PMM 100 cannot be closed. Consequently, nothing happens, via step 433. Thus, step 432 may be repeated. If it is determined that there is power to the PMM 100, in step 432, then the PMM 100, or the appropriate switches in the PMM 100, are initialized and the LED indicating that the PMM 100 is not functional is shut off, via step 434. Step 434 is also performed if the manual reset switch (shown in FIG. 4 as the local manual reset switch 322) is pushed closed for less than a particular time, preferably ten seconds, in step 435. Once the PMM 100 is initialized, it is determined if the internal switch temperature for one or more switches is above a particular limit, via step 436. For example, step 436 may use the temperature sensor 328 to determine whether the temperature of the switch 320 is above the particular limit. The particular limit for a switch may depend upon the physical construction of the switch. If the temperatures of the switch or switches are above the limit, then the switch(es) remain open or are opened, depending on the current states of the switch(es), via step 438. If the internal switch temperatures for the switch(es) are below the particular limit, then it may be determined if the manual reset has been closed for greater than a particular time, preferably ten seconds, via step 437. Thus, step 437 may determine whether the manual reset switch is stuck closed. If so, then step 438 is performed. Otherwise, the switch(es) are closed, via step 439. Thus, power is provided to the appropriate portion(s) of the cranking subsystem. It is determined whether the voltage of the power supply, such as the battery pack 310, is below a particular point, via step 440. If so, then step 438 is performed. If the voltage is above the particular point, then step 441 is performed. Note that step 440 may be performed prior to step 439. If so, then step 439 is performed if the voltage of the power supply is above the particular point, while step 438 is performed if the voltage of the power supply is below a certain point. In such a case, step 441 would be performed after step 439. Step 441 determines whether the current through the switch(es) and time for which current has been flowing meet a certain relationship and whether the engine running input indicates that the engine is not on. Preferably, step 441 determines whether the currents and times are within the range for safe operation of the cranking system. The currents and times set in step 441 are sufficiently low to ensure that the switch(es) do not burn out. In the embodiment depicted in FIGS. 6B–C, the current and times which are set for the switch 321 are: between zero and four hundred fifty amps for greater than thirty seconds, between four hundred fifty-one and nine hundred amps for greater than twenty seconds, or between nine hundred and one and one thousand five hundred amps for greater than ten milliseconds. The currents and time selected could be different for other truck tractors or other applications. If the currents and times do not exhibit the selected relationships, then the switch(es) are opened in step 438. Steps in the method 430, such as steps 440 and 441 may be carried out continuously to ensure that no damage is done to the cranking subsystem 300 or to the PMM 100. Step 441 also checks to determine whether the engine is running. If the engine is running, then step 438 is performed to open the switches and stop power from flowing to the cranking subsystem. Other conditions can be added to step 441 or added as other steps to provide additional intelligence and features. Furthermore, determining whether the engine is running and determining whether other conditions are met could be performed at another point in the method 430 using a separate step. In such a case, the switch may merely remain open, preventing any power from flowing to the cranking subsystem.

Figure 7:
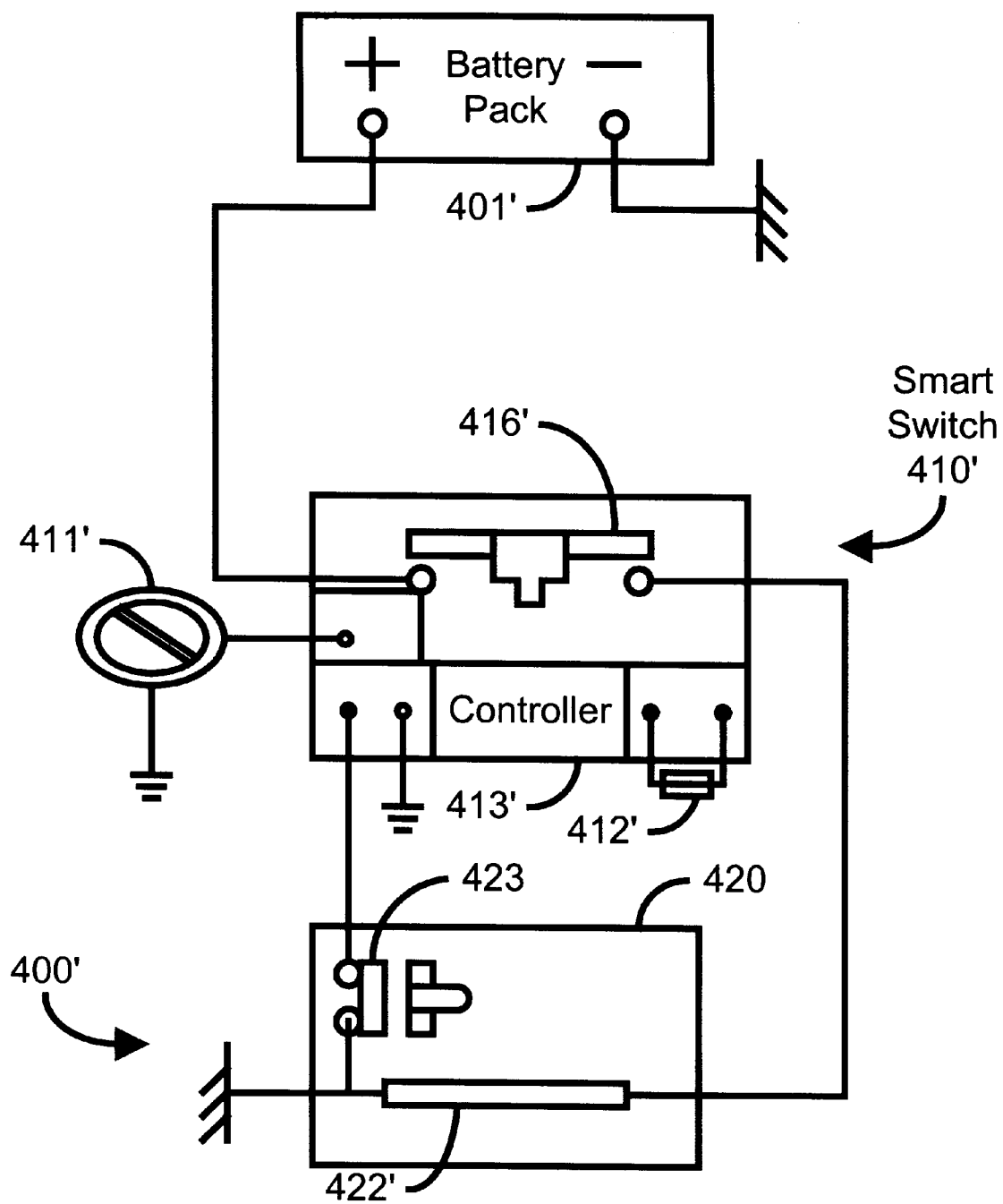
FIG. 7 is a diagram of a third embodiment of how the power management module in accordance with the present invention can be used for auto-disconnect to protect against overcranking.

FIG. 7 depicts another embodiment of a system for protecting against overcranking using the PMM 100. Thus, a portion of the PMM 100 is shown in conjunction with a battery pack 401' and a portion of the cranking subsystem 400'. The portion of the PMM 100 is indicated as the INTRA smart switch 410'. Although numbered differently, components of the smart switch 410' correspond to similarly named components in the PMM 100. The smart switch 410' includes the controller 413', switch 416' and receives inputs indicating whether the engine is running and whether the start switch has been turned via lines 412' and 411', respectively. The switch 416' is coupled to the positive terminal of the battery pack 401', while the negative terminal, or ground, of the battery back 401' can be viewed as being connected to the cranking subsystem 400'. The portion of the cranking subsystem 400' shown is a single latch (pull-in) and hold coil winding 422'. Also shown in the cranking subsystem is the thermal switch 423, which is normally closed. Preferably, the thermal switch 423 opens at higher temperatures, but closes when the cranking subsystem 400' cools down. Other components of the cranking subsystem 400' are not depicted for clarity. However, there is no magnetic switch in the cranking subsystem 400'.

In the embodiment shown in FIG. 7, the PMM 100 replaces the magnetic switch 308 shown in FIG. 4. The embodiment shown in FIG. 7 also allows the single latch and hold coil winding 422' to replace the pull-in winding 302 and the hold-in winding 303 of the cranking subsystem 300 depicted in FIG. 4. Referring back to FIG. 7, when the start switch is closed, the controller 413' may close the switch 416'. The controller 413' may impose conditions other than the start switch being closed for the switch 416' to close. For example, the controller may only close the switch if there is a minimum voltage level of the battery 401' or a particular temperature of the switch 416' that is less than a particular level. When the switch 416' is closed, the positive terminal of the battery 401' is connected to the single latch and hold coil winding 422'. The single latch and hold coil winding 422' then pulls the front gear of the starter motor (not shown) to the engine's front gear (not shown) and holds the starter motor front gear in position. In a preferred embodiment, the power to the single latch and hold coil winding 422' is reduced when the starter motor's front gear is engaged with the engine's front gear. This is because it takes less power to hold the starter motor's front gear in place than to pull the front gear into place.

Based on certain criteria, the controller 413' may not close one or more of the switches 416'. Thus, no power will be provided to the cranking subsystem 400' and cranking will be prevented. Furthermore, based on some criteria, the controller 413' may open the switch 416', automatically disconnecting power to the cranking subsystem 400'. As a result, cranking will be stopped. The criteria used for refusing to close the switch 416' and the criteria used for opening the switch 416' may be programmed into the controller 413'. In a preferred embodiment, the criteria include providing a particular current to the cranking subsystem 400' for a particular amount of time; the temperature, voltage or current through the switch 416' exceeding particular thresholds, and the battery pack 401' having a voltage that is below a particular level. Also in a preferred embodiment, the PMM 100 will open the switch 416' when the behavior of the cranking subsystem 400' deviates from an expected behavior by a certain amount. Furthermore, the PMM 100 could control the switch 401' based on other criteria, such as signals input to the PMM 100 from the engine or other portion of the truck tractor.

Because the switch 416' control current to the single latch and hold coil winding 422', the hold-in winding 303 and the magnetic switch 308 shown in FIG. 4 may be eliminated. The magnetic switch 308 can be eliminated because the switch 416' controls power to the single latch and hold coil winding 422'. The hold-in windings 303 can be eliminated because the controller 413' controls the switch 416' to provide PWM. In other words, the controller 413' controls the switch 416' to open and close at a desired rate, which results in PWM. PWM steps down the power provided to the single latch and hold coil winding 422'. Thus, the single latch and hold coil winding 422' can be used to engage the starter motor's front gear, which requires a certain amount of power, and to hold the starter motor's front gear in place, which requires less power, without overheating. Once the single latch and hold coil winding 422' is energized and the starter motor's front gear in place, the main contacts (not shown) are closed automatically.

Because the single switch 412' is used in lieu of a magnetic switch, more components can be eliminated from the cranking subsystem 400'. The pull-in winding may be eliminated from the cranking subsystem 400'. Thus, the costs of the cranking subsystem 400' and the cost of the PMM 100 thus decrease.

It is also noted that the PMM 100, as used for overcranking protection in FIGS. 4–7, can also increase the chance of successful cranking during cold weather. This is accomplished by keeping minimums level of charges in the battery. Furthermore, the speed of engagement has an impact on starter life of the cranking subsystems 300, 400 and 400'. Conventional systems do not contain specific controls to regulate this speed. The PMM 100 here can regulate the speed through PWM of latch/hold coil, as discussed above.

PWM can also help prevent spikes. When a component like the cranking subsystem is started, the current drawn rises to a high spike is unregulated. The peak current could be four times the average current. This high current rush puts stress on the electrical system. The PMM 100 can limit the peak rush-in current by turning on and off the switches, in a manner similar to PWM. Thus, current spikes are reduced in magnitude.

Figure 8A:
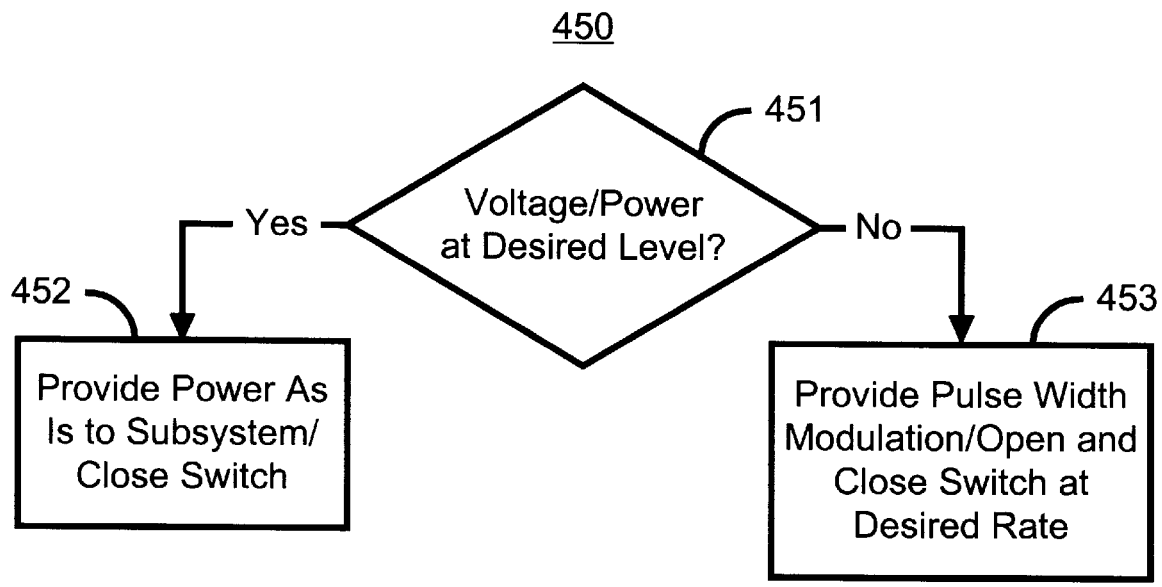
FIG. 8A is a flow chart depicting one embodiment of a method for stepping down the power using the power management module in accordance with the present invention.

FIG. 8A depicts one embodiment of a method 450 for stepping down the power provided by a voltage source using the PMM 10 or 100. The method 450 can be used with any PMM 10 or 100 which steps down the voltage provided by a power supply. For example, the PMMs 10 and 100 depicted in FIGS. 1A–B, 2A and 3 may utilize the method 450 for providing PWM. PWM may also be provided in other instances, such as stepping down the voltage of a power supply for providing power to lights or other systems in a device such as a truck tractor. PWM can also be used to regulate the power from the alternator or other power generator, as described below. In such a case, the switch which is toggled may be coupled between the alternator and the other portions of the device. PWM helps prevent the device from drawing too much power from the alternator during starting. In such a case, the power output by the power source (e.g. alternator), rather than the power input to a power consumer, is desired to be regulated. PWM can also help prevent spikes. For example, when a component like the cranking subsystem of a truck tractor is started, the current drawn rises to a high spike is unregulated. The peak current could be four times the average current. This high current rush puts stress on the electrical system. The PMM 10 or 100 can limit the peak rush-in current by turning on and off the switches, in a manner similar to PWM. Thus, current spikes are reduced in magnitude.

Referring to FIGS. 8A and 2A, the controller for the PMM 100 determines whether the voltage provided by the power supply for a particular subsystem is at the desired level, via step 451. Step 451 may be performed by comparing the voltage provided to the subsystem to a particular level at a particular time or by determining that the voltage is to be stepped down at a particular time. If the voltage is at the desired level, then the switch for the subsystem is closed, via step 452. If the voltage is not at the desired level, then the controller provides pulse with modulation by commanding the appropriate switch to open and close at the rate desired for the stepped down voltage, via step 453. In one embodiment, the rate at which the switch should be opened and closed is previously known. In such an embodiment, step 453 can include simply opening and closing the switch at the known rate.

Figure 8B:
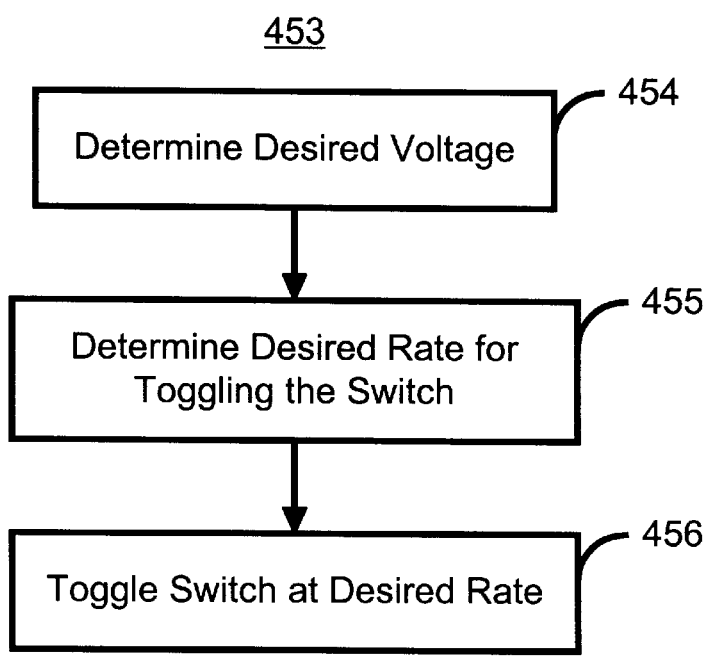
FIG. 8B is a flow chart depicting another embodiment of a method for stepping down the power using the power management module in accordance with the present invention.

FIG. 8B depicts one embodiment of the step 453, providing PWM for the desired voltage. The desired voltage is determined, via step 454. The desired rate at which the switch should be opened and closed based on the current voltage and the desired voltage is determined, via step 455. The switch is then opened and closed at the desired rate, via step 456.

Figure 9:
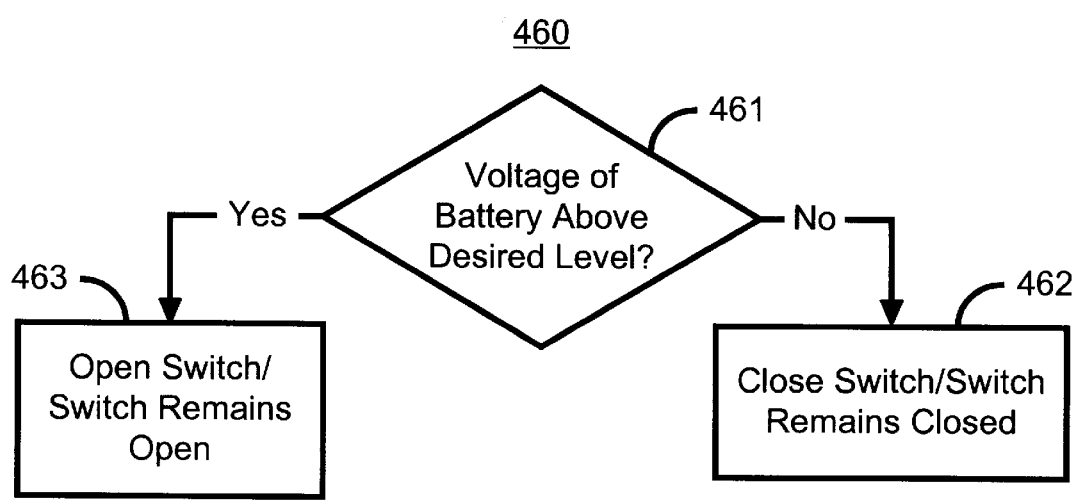
FIG. 9 depicts one embodiment of a method for cutting off power due to power supply voltage level using the power management module in accordance with the present invention.

The PWM 10 or 100 in accordance with the present invention can also control the power supply to help prevent the power supply from being unduly drained or to manage the state of the power supply. FIG. 9 depicts one embodiment of a method 460 for cutting off power due to power supply voltage level using the power management module in accordance with the present invention. It is determined whether the voltage of the power supply, particularly the battery which stores power, is above a particular level, via step 461. The level might differ for a variety of reasons. For example the level may be higher when a power generator, such as the alternator, is operating. The voltage determined in step 461 may also represent an alternator. Thus, if the alternator stops functioning, it will be ensured that the battery does not become discharged. If the voltage level is not above the level, then at least one switch in the PMM 10 or 100 that couples the power supply to a power consumer is open or forced to remain open (not allowed to close), via step 462. If, however, the voltage of the power supply is above the particular level, then the switch is closed or allowed to remain closed, via step 463. The voltage of the power supply is then continued to be monitored by returning to step 461.

Figure 10A:
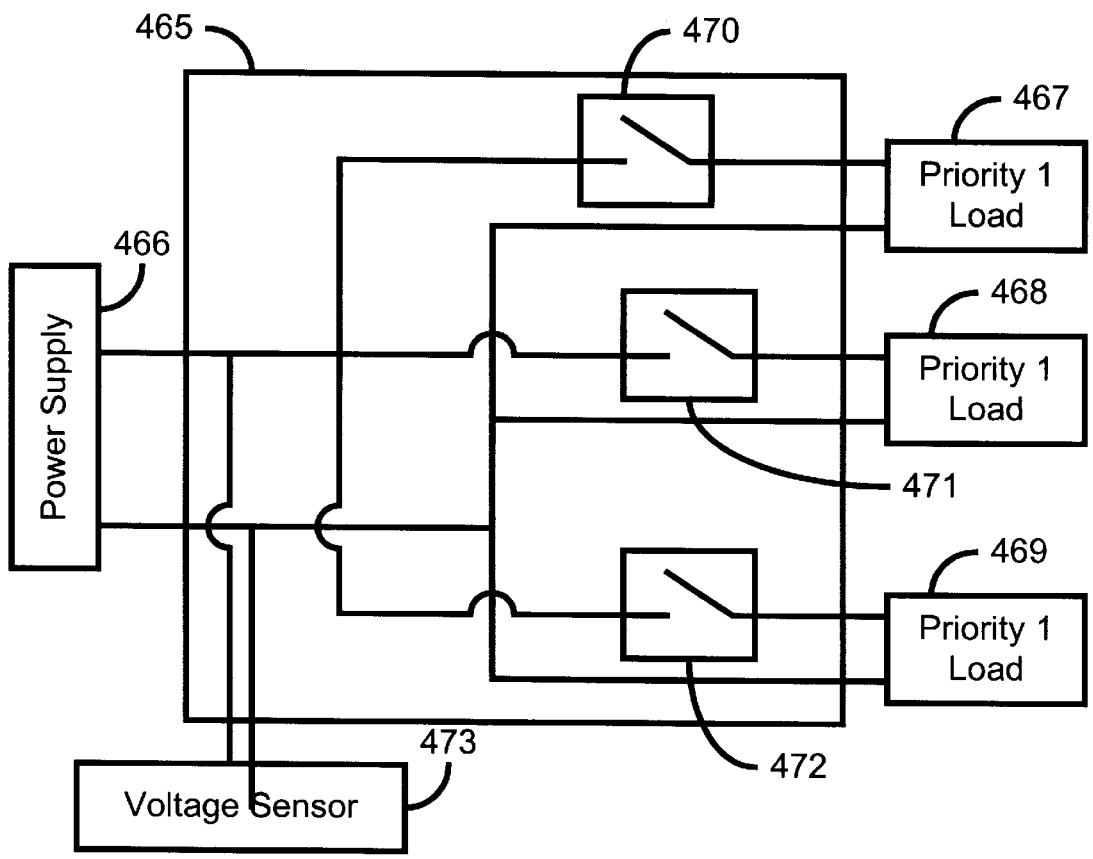
FIG. 10A depicts one embodiment of a system for cutting off power based on priority due to power supply voltage level using the power management module in accordance with the present invention.

FIG. 10A depicts one embodiment of a system 465 which cuts off power based on priority due to power supply voltage level using the PMM 10 or 100 in accordance with the present invention. The system 465 will be described in the context of a truck tractor which includes a battery and alternator as a power source and which utilizes the PMM 10 or 100. Power is provided from a battery and, if the engine is running, an alternator via lines 466. Power is provided to loads via lines 467, 468 and 469. The switches 470, 471, and 472, which are part of a PMM 100 (other components of which are not explicitly shown) determine whether power is provided to the lines 467, 468, and 469. The lines 467 supply power to a power consumer that is a priority one, or highest priority, load. The lines 468 supply power to a power consumer that is a priority two, or next highest priority, load. The lines 469 supply power to a power consumer that is a priority three, or lowest priority, load. When the voltage of the battery drops below a certain level, the loads are disconnected based on their priority. Thus, the lines 469 will be disconnected first, by opening the switch 472. The lines 468 will be disconnected next, by opening the switch 471. The lines 467 will be disconnected last, by opening the switch 470. Note criteria other than or in addition to the voltage of the battery could be used in cutting off power to the power consumers. For example, power could be cut off to loads based on the ability of the alternator to charge the battery. A controller (not shown in FIG. 10A) determines which, if any, switch to close and ensures that the switches are closed in order of priority.

Figure 10B:
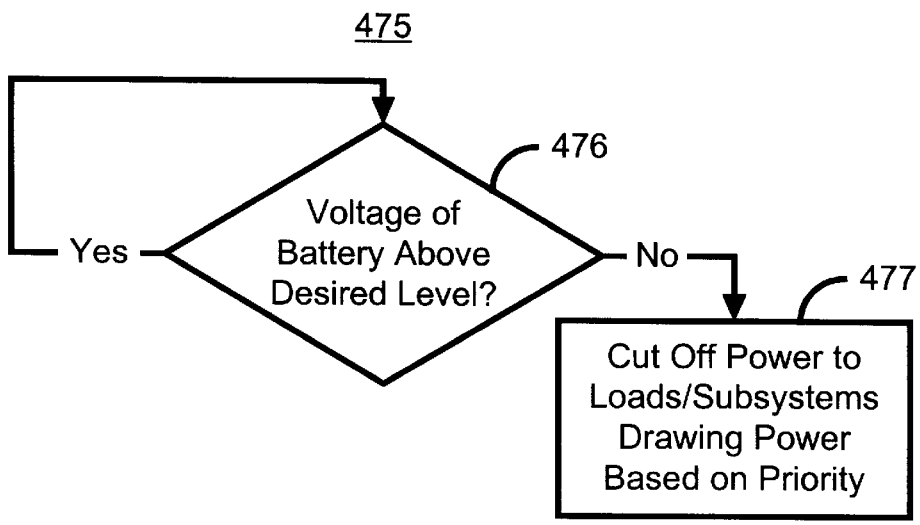
FIG. 10B depicts one embodiment of a method for cutting off power based on priority due to power supply voltage level using the power management module in accordance with the present invention.
Figure 10C:
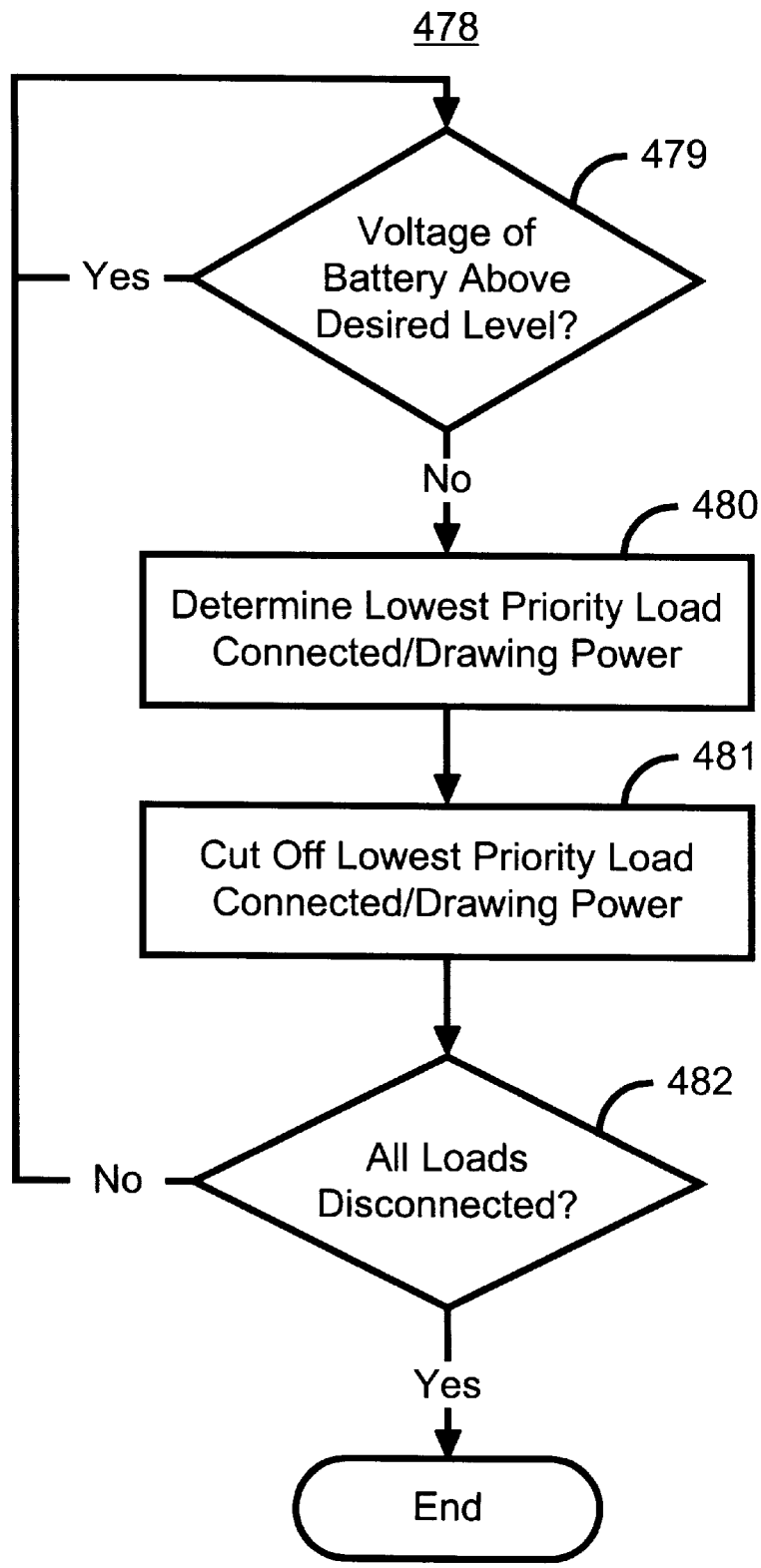
FIG. 10C depicts another embodiment of a method for cutting off power based on priority due to power supply voltage level using the power management module in accordance with the present invention.

There are many methods which can be used in conjunction with the system 465 for disconnecting power to power consumers based on their priority. Furthermore, one or more voltage levels at which loads of particular priorities are cut off. For example, FIGS. 10B–10C depict two methods for disconnecting power consumers based on their priority. Prioritization is desired so that loads which a user deems less important, such as a microwave or cooling can be shut off before loads which are deemed more important. Furthermore, a user may be allowed to set the priorities of different power consumers as well as the voltage level(s) above which the battery is desired to be kept.

FIG. 10B depicts one embodiment of a method 475 for cutting off power based on priority due to power supply voltage level using the PMM 100 in accordance with the present invention. It is determined whether the voltage of the battery is above a desired level, via step 476. The desired level is preferably predetermined and programmed into the controller. Step 476 is preferably performed by measuring the voltage of the battery and using the controller to compare the measured voltage with the desired level. If the voltage of the battery has not dropped below the desired level, step 476 is repeated. Thus, the voltage of the battery continues to be monitored. If the voltage of the battery has dropped below the desired level, then one or more power consumers, or loads, are cut off based on their priority, via step 477.

FIG. 10C is a more detailed flow chart of one embodiment of a method 478 for cutting off power based on priority due to power supply voltage level using the PMM 100 in accordance with the present invention. It is determined whether the voltage of the battery is above a desired level, via step 479. The desired level is preferably predetermined and programmed into the controller. Step 479 is preferably performed by measuring the voltage of the battery and using the controller to compare the measured voltage with the desired level. If the voltage of the battery is still above the desired level, step 479 is repeated. Thus, the voltage of the battery continues to be monitored. If the voltage of the battery has dropped below the desired level, then the lowest priority load (power consumer) currently receiving power is determined, via step 480. Power is then cut off to the lowest priority load, via step 481. Step 481 is performed by the controller of the PMM 100 opening the appropriate switch in the PMM 100 for the lowest priority load. It is then determined if all loads have been cut off, via step 482. If so, then no more loads can be cut off, and the method terminates. If not, then step 479 and appropriate additional steps are repeated. Because the loads can be cut off using the mechanisms depicted in FIGS. 8A–10C, the performance and lifetime of the battery may be extended. In addition, the minimum charge required to crank the engine may be preserved.

Figure 11A:
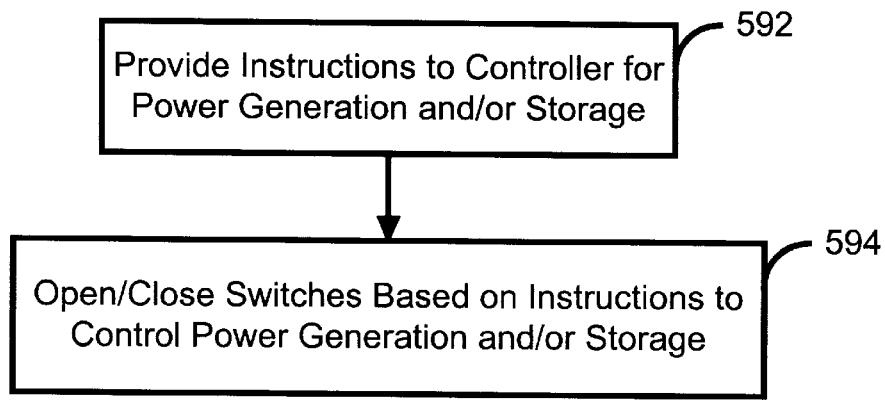
FIG. 11A depicts one embodiment of a method for controlling power generation or storage using the power management module in accordance with the present invention.

The PWM 100 in accordance with the present invention can control the power supply to help prevent the power supply from being unduly drained or to manage the state of the power supply. FIG. 11A is a high-level flow chart of a method 590 for controlling power generation and/or storage using the PMM 10 or 100 in accordance with the present invention. Instructions for controlling the power generation and/or storage are provided to the controller of the PMM 10 or 100, via step 592. The instructions indicate to the controller how and under what conditions the power generation and/or storage should be controlled. For example, the instructions provided to the controller in step 592 may indicate that the demand on the alternator should be controlled during start-up, thus controlling power generation. Similarly, the instructions may indicate that the power supplied to the battery should be controlled thus controlling power storage. The switch or switches coupled with the power supply, such as the alternator and/or battery, are then opened or closed in accordance with the instructions provided to the controller, via step 594. Note that the method 590 can be viewed as a special case of the method 50 depicted in FIG. 1F. Referring back to FIG. 11A, in some embodiments, the switch(es) are toggled in step 594 to provide PWM. Thus, power generation and/or storage can be controlled. The performance and lifetime of the power supply, such as the alternator and/or battery, can therefore be improved.

The PMM 10 or 100 can also control the power of the truck tractor so that the condition of the battery is more optimized. In order to do so, the PMM 100 may control charging of the battery, send out alarms or otherwise monitor and control the power supply and subsystems of the truck tractor. Thus, the PMM 10 or 100 controls the storage of power in the power supply. In order to do so, the PMM 10 or 100 uses the method 590 depicted in FIG. 11A. In addition, the PMM 10 or 100 can use the methods 450 and 453 depicted in FIGS. 8A and 8B.

Figure 11B:
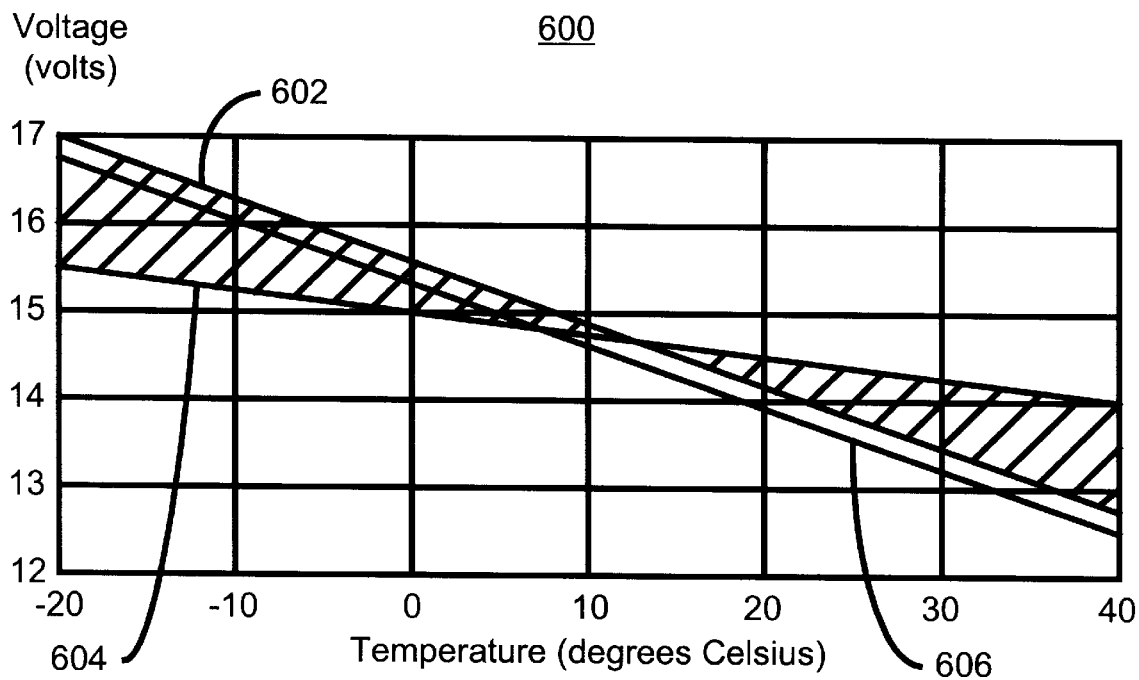
FIG. 11B is a graph depicting how a battery is conventionally charged and how the power management module in accordance with the present invention can charge the battery.

For example, FIG. 11B is a graph 600 depicting how a battery is conventionally charged and how the power management module in accordance with the present invention can charge the battery. Lines 602 and 604 depict the range in which conventional systems charge a battery versus temperature. The line 606 depicts the desired, or ideal, charge for a battery versus temperature. Typically, conventional systems charge the battery using any portion of the output of the alternator which is not being consumed by subsystems of the truck tractor. Thus, the outputs of the alternator and power input to the battery are not controlled. As a result, at lower temperatures, conventional systems undercharge the battery. In addition, conventional systems overcharge the battery at higher temperatures. However, the PMM 100 in accordance with the present invention can control the truck tractor such that the battery is charged at or near the ideal at a wide range of temperatures.

Figure 11C:
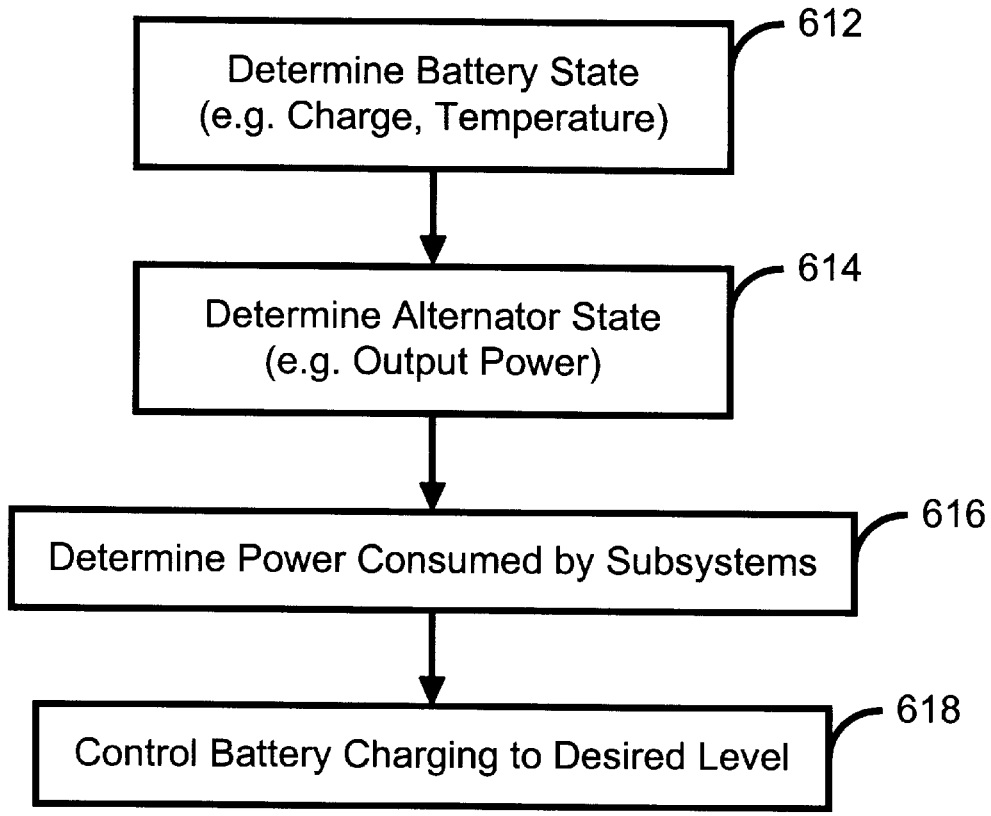
FIG. 11C is a high level flow chart of one embodiment of a method for controlling the charging of the battery using the power management module in accordance with the present invention.

FIG. 11C is a high level flow chart of one embodiment of a method 610 for controlling the charging of the battery using the PMM 10 or 100 in accordance with the present invention. The method 610 can be viewed as performing the step 54 or 64 of the method 50 or 590 depicted in FIG. 1F or FIG. 11A. In other words, the method 610 controls the switch of the PMM 100 or 10 based on the program previously entered. The state of the battery is determined by the PMM 100, via step 612. In a preferred embodiment, step 612 includes determining the temperature, the current charge and the desired charge of the battery at the current temperature of the battery. However, step 612 could include determining other factors. The state of the alternator is determined by the PMM 10 or 100, via step 614. Step 614 preferably includes determining the current output of the alternator. The power being consumed, or power available to charge the battery, is then determined, via step 616. The charge of the battery is then controlled, preferably to be close to the ideal charge, via step 618. Step 618 may include controlling the output of the alternator, the power consumed by subsystems of the truck tractor or the power input to the battery. For example, the alternator could be controlled to output less power or PWM may be used to reduce the power provided to the battery. In a preferred embodiment, a switch of the PMM 10 or 100 is coupled between the alternator and the battery. The PMM 10 or 100 preferably opens and closes the switch to regulate the power flowing through the battery using PWM. Consequently, the charging of the battery can be controlled. Because the charging of the battery can be controlled to be closer to ideal, the performance and lifetime of the battery may be extended.

Figure 11D:
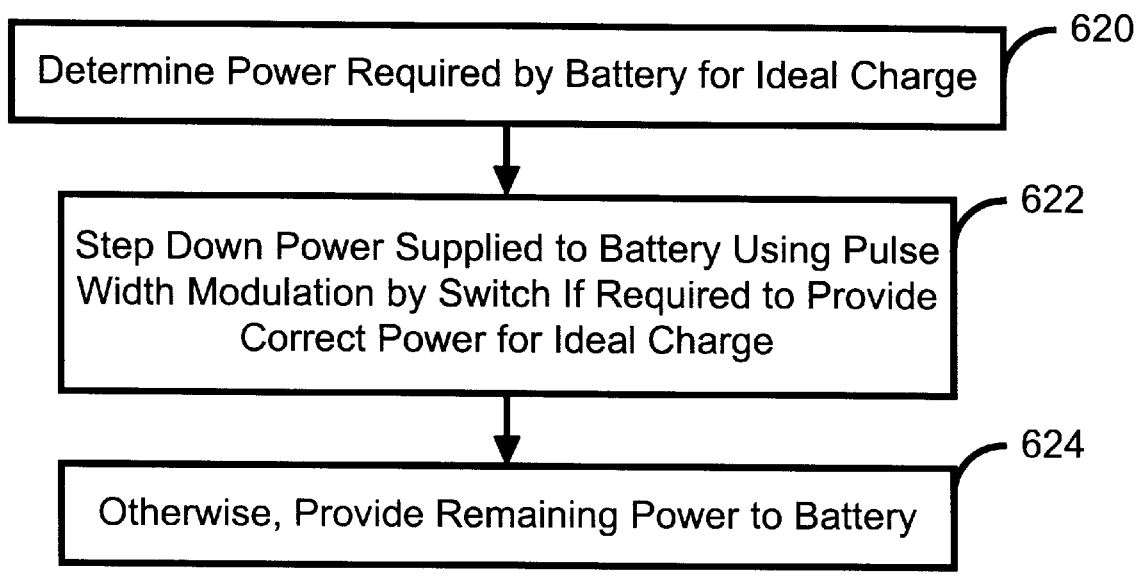
FIG. 11D is a high level flow chart of one embodiment of a method for controlling the charging of the battery to a desired level using the power management module in accordance with the present invention.

FIG. 11D is a high level flow chart of one embodiment of a method for performing step 618, controlling the charging of the battery to a desired level. The ideal power to be supplied to the battery for an ideal charge is determined, via step 620. Step 620 is preferably performed using the characteristics of the battery determined in step 612 of the method 610 depicted in FIG. 11C. Referring back to FIG. 11D, the power provided from the alternator to the battery is stepped down using PWM to provide the ideal power to the battery if the ideal power is less than the power that would otherwise be supplied to the battery, via step 622. The power that would otherwise be supplied to the battery is preferably determined using the state of the alternator determined in step 614 and the power being consumed in step 616 of the method 610 depicted in FIG. 11C. Referring back to FIG. 11D, step 622 is performed by toggling one or more switches between the alternator and the battery at a rate sufficient to step down the power provided to the battery to the ideal power. If the ideal power is not less than the power that would otherwise be provided to the battery, then that power is provided to the battery, via step 624. In a preferred embodiment, step 624 provides all remaining available power to the battery after other power consumers are provided with power. Thus, using PWM, the PMM 10 and 100 can charge a battery to at or about the ideal level.

Figure 11E:
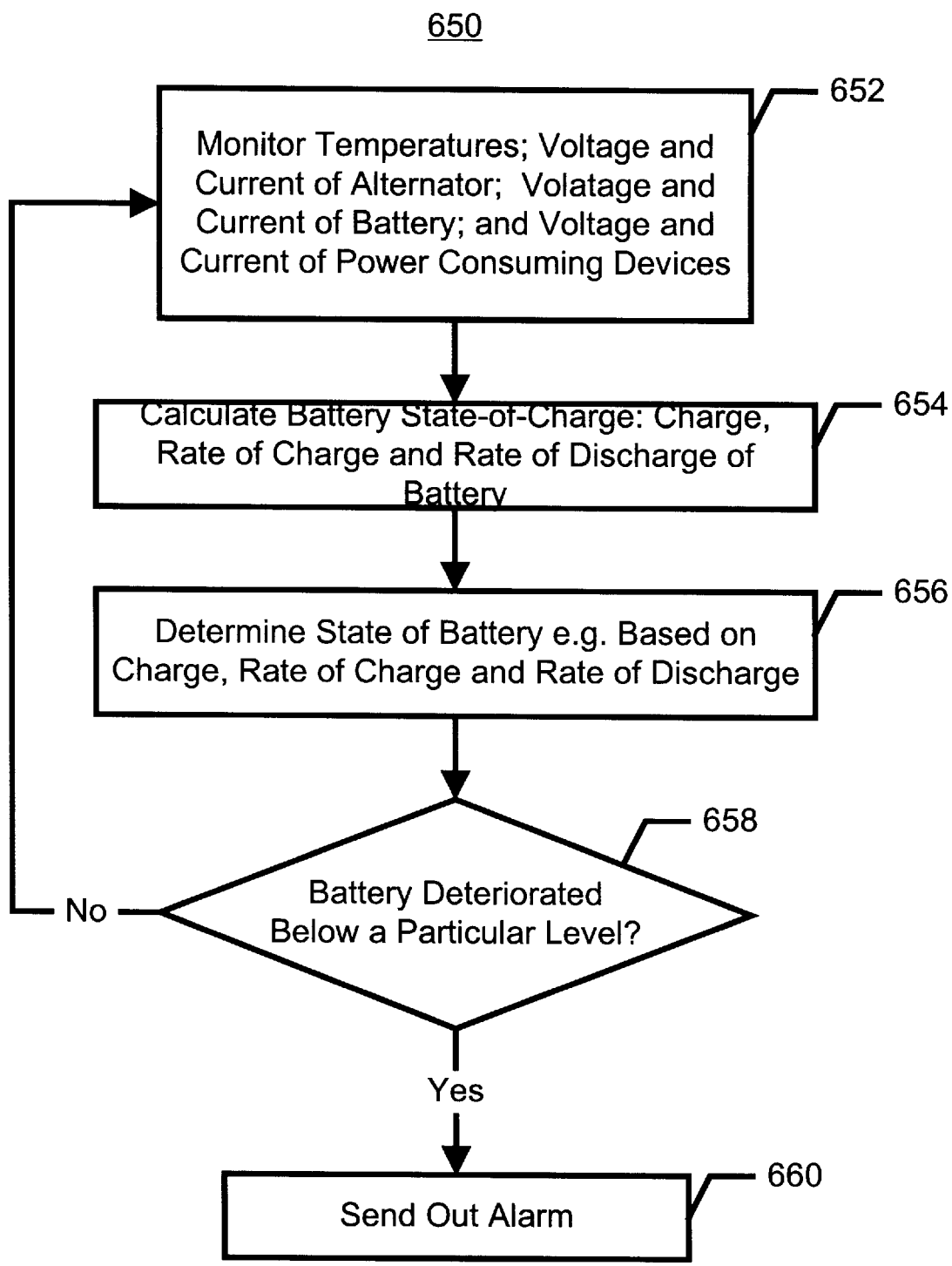
FIG. 11E flow chart of one embodiment of a method for controlling the power using the power management module in accordance with the present invention.

FIG. 11E is a flow chart of one embodiment of a method 650 for controlling the power using the PMM 100 in accordance with the present invention. The temperatures, voltage and current of the alternator; the voltage and current of the battery; and the voltage across and current through the subsystems (power consumers) are monitored by the PMM, via step 652. The state of charge, rate of charge, and rate of discharge of the battery are calculated, via step 654. The condition of the battery is determined, via step 656. It is determined whether the state of the battery has deteriorated below a particular level, via step 658. If not, then the method returns to step 652. If so, then an alarm is sent out, via step 670. Thus, the state of the battery can be monitored and kept above a desired level. Preferably the desired level is above a level at which the battery will fail. Because an alarm is provided, the user can change the battery or take other action before the battery fails. Thus, unanticipated failure of the battery may be avoided.

In addition to the above mentioned functions, the PMM 100 in accordance with the present invention may learn the properties of particular subsystems and diagnose potential failures. Subsystems, which can include individual components, typically have individual current and voltage characteristics as a function of time. Based on these characteristics, the PMM 100 can control the power supply to diagnose impending failure and take action against such failure, such as cutting power or providing an alarm to a user. Note that the methods depicted in FIG. 11A–11E can be considered provide such a function for the battery. However, this function will be discussed further with respect to FIGS. 12A–13D.

Figure 12A:
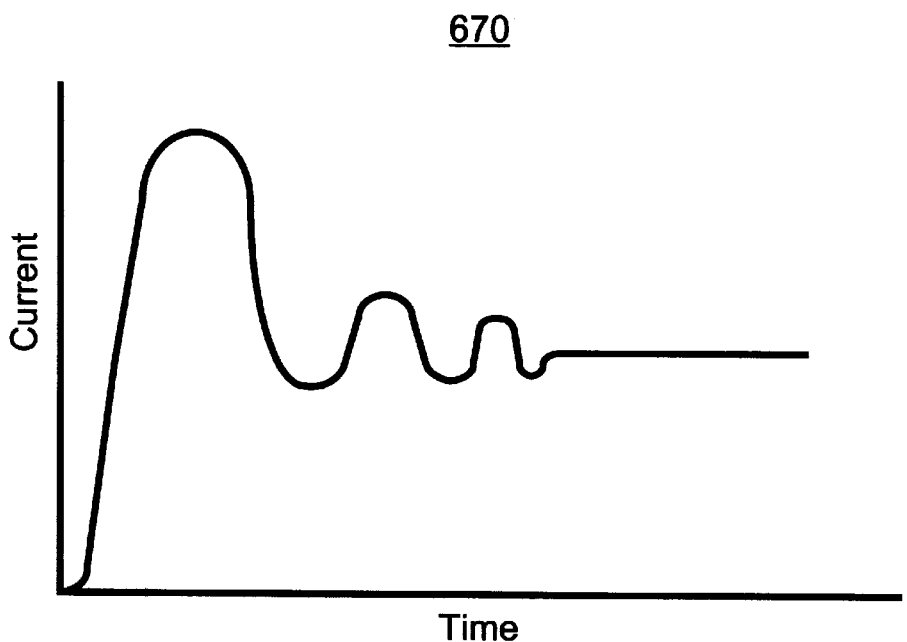
FIG. 12A depicts a typical starter (cranking subsystem) signature.
Figure 12B:
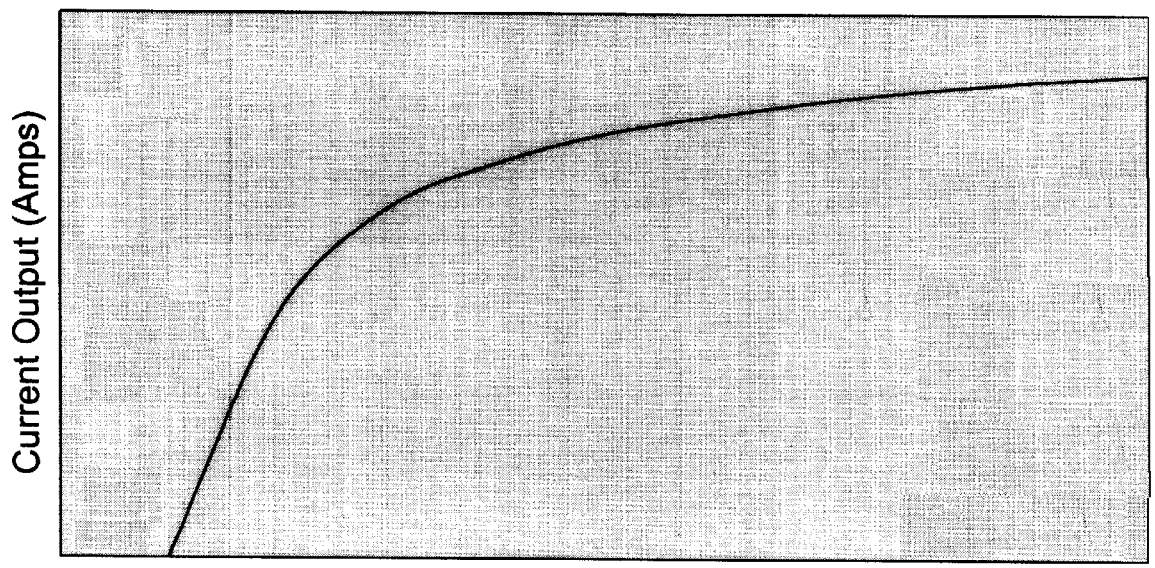
FIG. 12B depicts a typical alternator signature for current versus alternator rotation.
Figure 12C:
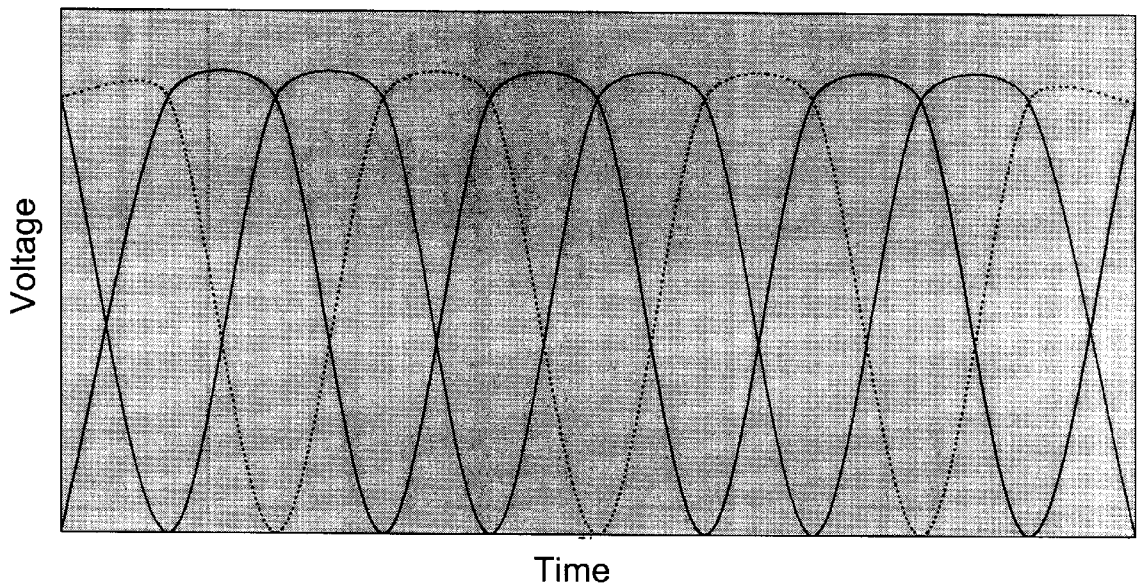
FIG. 12C depicts a typical alternator voltage signature.

FIG. 12A depicts a typical starter (cranking subsystem) signature 670. FIG. 12B depicts a typical alternator current signature 675. FIG. 12C depicts a typical alternator voltage signature 680. Furthermore, other signatures can be used. Signatures from other subsystems or components of the truck tractor can also be obtained. Each signature is a measure of the normal behavior of the corresponding device. These signatures can be provided to the PMM 100. For example, the signatures 670, 675 and 680 might be provided to the controller of the PMM 100 when the software is loaded in step 52 of the method 50 depicted in FIG. 1F. Referring back to FIGS. 12B and 12C, the PMM 100 can learn these signatures 675 and 680 by sampling the cranking subsystem and alternator. Default initial signatures, which the PMM 100 can replace with learned signatures, can also be provided to the PMM 100. Based on the signatures, the PMM 100 can diagnose and take action on potential problems.

Figure 12D:
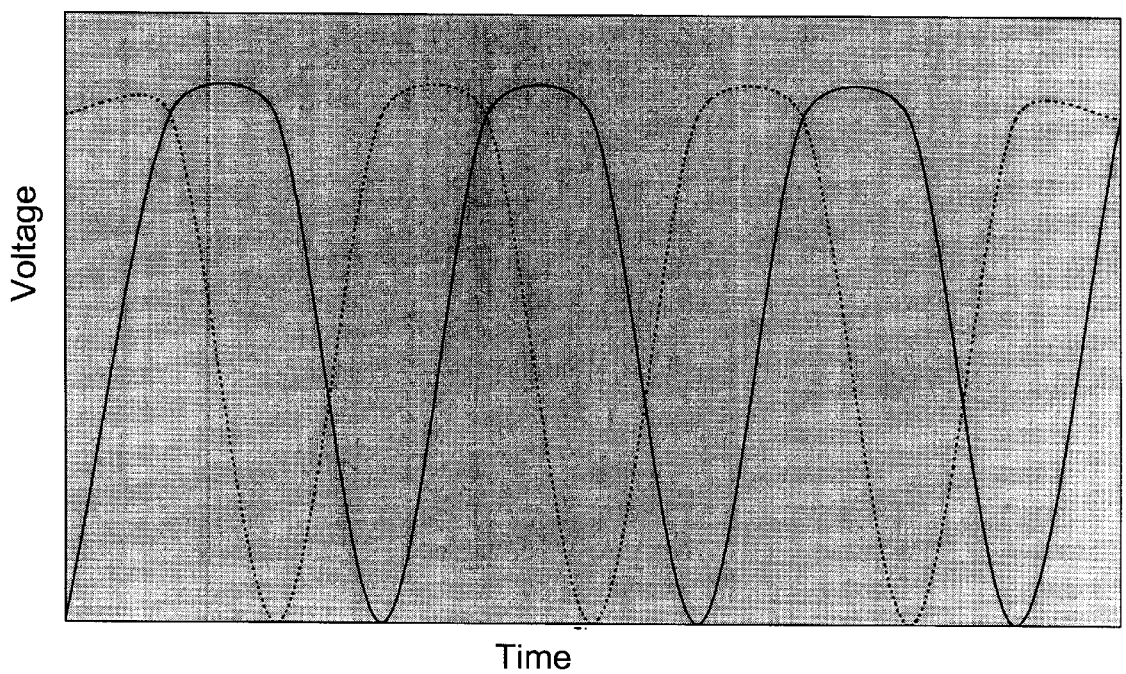
FIG. 12D depicts alternator voltage behavior when a phase has failed.

For example, FIG. 12D depicts an alternator voltage signal 685 that occurs when the alternator has a phase missing. A comparison of the normal alternator voltage signal 680 of FIG. 12C and the alternator voltage signal 685 occurring when there is a fault results in a difference between the signatures. Using the method described below, the PMM 10 or 100 can diagnose the failure of the alternator using signatures, such as the signatures 680 and 685.

Figure 13A:
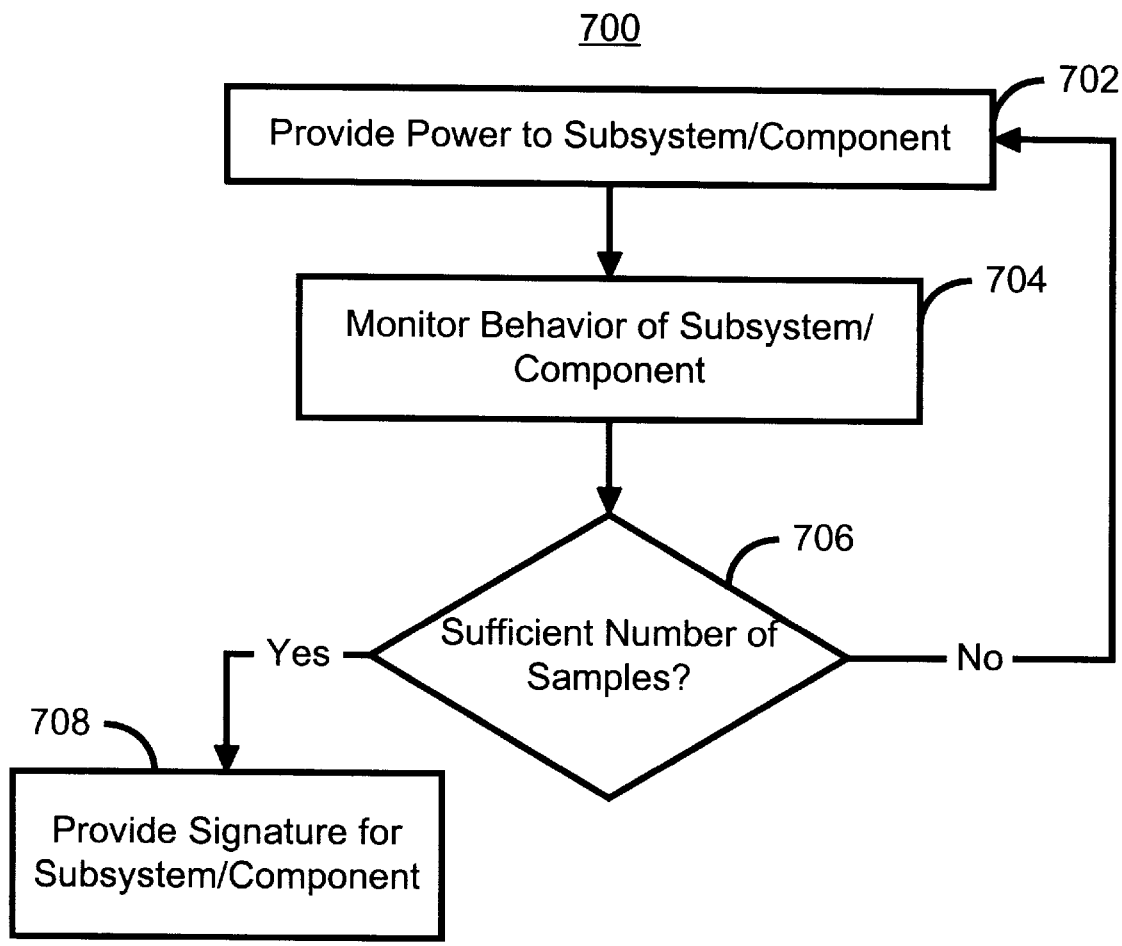
FIG. 13A depicts one embodiment of a method for learning the signatures of a subsystem using the power management module in accordance with the present invention.

FIG. 13A depicts an embodiment of a method 700 for learning the signatures of a subsystem using the PMM 100 in accordance with the present invention. Preferably, the method 700 is performed around the time of manufacture of the truck tractor. Although the method 700 is described in the context of a single subsystem or component, the method 700 may be carried out in parallel for multiple subsystems or components. Power is provided to the subsystem or component from which a signature is to be obtained, via step 702. Step 702 may be performed by closing the appropriate switch in the PMM 100 which allows the power supply to be connected to the component or subsystem. However, that for the alternator or battery, a switch in the PMM 100 may not be utilized. The behavior of the subsystem or device is then monitored, via step 704. Step 704 preferably includes determining the current and voltage characteristics for the subsystem or component for a particular time. The time for which the subsystem or component is monitored may depend upon the characteristics of the subsystem or component. For example, the cranking subsystem may be monitored for thirty seconds, while another component or subsystem may be monitored for more or less time. It is then determined whether a sufficient number of samples have been obtained, via step 706. A sufficient number of samples can be determined by a user, and in one embodiment is fifty samples. If a sufficient number of samples has not been obtained, then the method returns to step 702. In one embodiment, the method 700 may also calculate the current signature, based on the (insufficient) number of samples, and return to step 702 to monitor the behavior of the subsystem. For example, the average of the samples taken so far may be calculated. Furthermore, the current signature based on the (insufficient) number of samples may be used in the method 750, discussed below, or may be combined with a default signature for use in the method 750. If it is determined that a sufficient number of samples have been obtained, then a signature for the component or subsystem is provided, via step 708. In one embodiment, step 708 include providing an average of the samples taken.

Figure 13B:
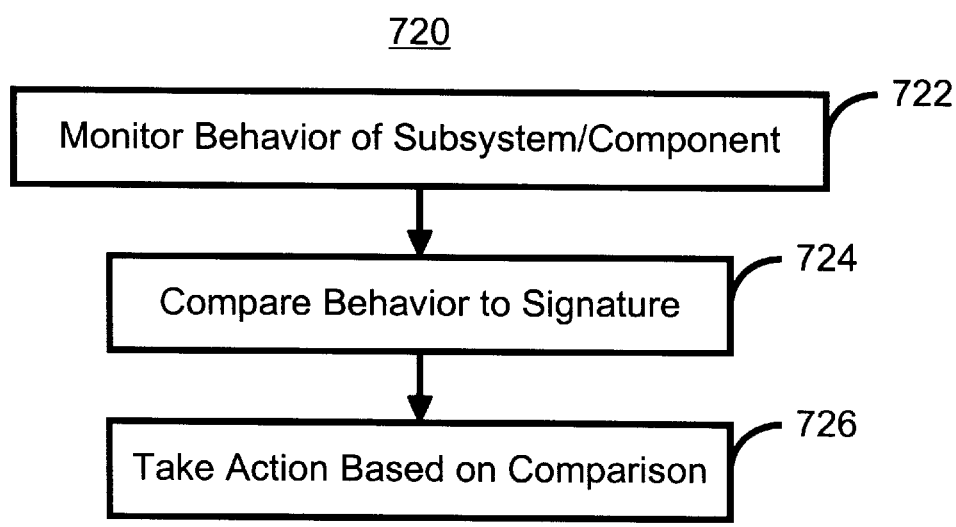
FIG. 13B depicts a high-level flow chart of one embodiment of a method for utilizing the signatures of a subsystem using the power management module in accordance with the present invention.

The PMM 100 also uses the signatures obtained or provided in monitoring the device. FIG. 13B is a high-level flow chart of one embodiment of a method 720 for utilizing the signatures of a subsystem using the PMM 100 in accordance with the present invention. Although the method 720 is described in the context of a single subsystem or component, the method 720 may be carried out in parallel for multiple subsystems or components. The method 720 may be considered to be a special case of carrying out step 54 of the method 50 depicted in FIG. 1E. Referring back to FIG. 13B, the behavior of a subsystem is monitored, via step 722. Step 722 preferably includes determining the current and voltage characteristics for the component or subsystem for a particular time. The time for which the subsystem or component is monitored may depend upon the characteristics of the subsystem or component. For example, the cranking subsystem may be monitored for thirty seconds, while another component or subsystem may be monitored for more or less time. Furthermore, the time for which the behavior is monitored in step 722 is preferably the time for which behavior is monitored in step 704, shown in FIG. 13A. Referring back to FIG. 13B, the signature is then compared to the monitored behavior, via step 724. Based on the comparison between the signature and the monitored behavior, the appropriate action is taken, via step 726. For example, the appropriate switch may be opened, closed, or left open or closed. In addition, an alarm may be provided.

Figure 13C:
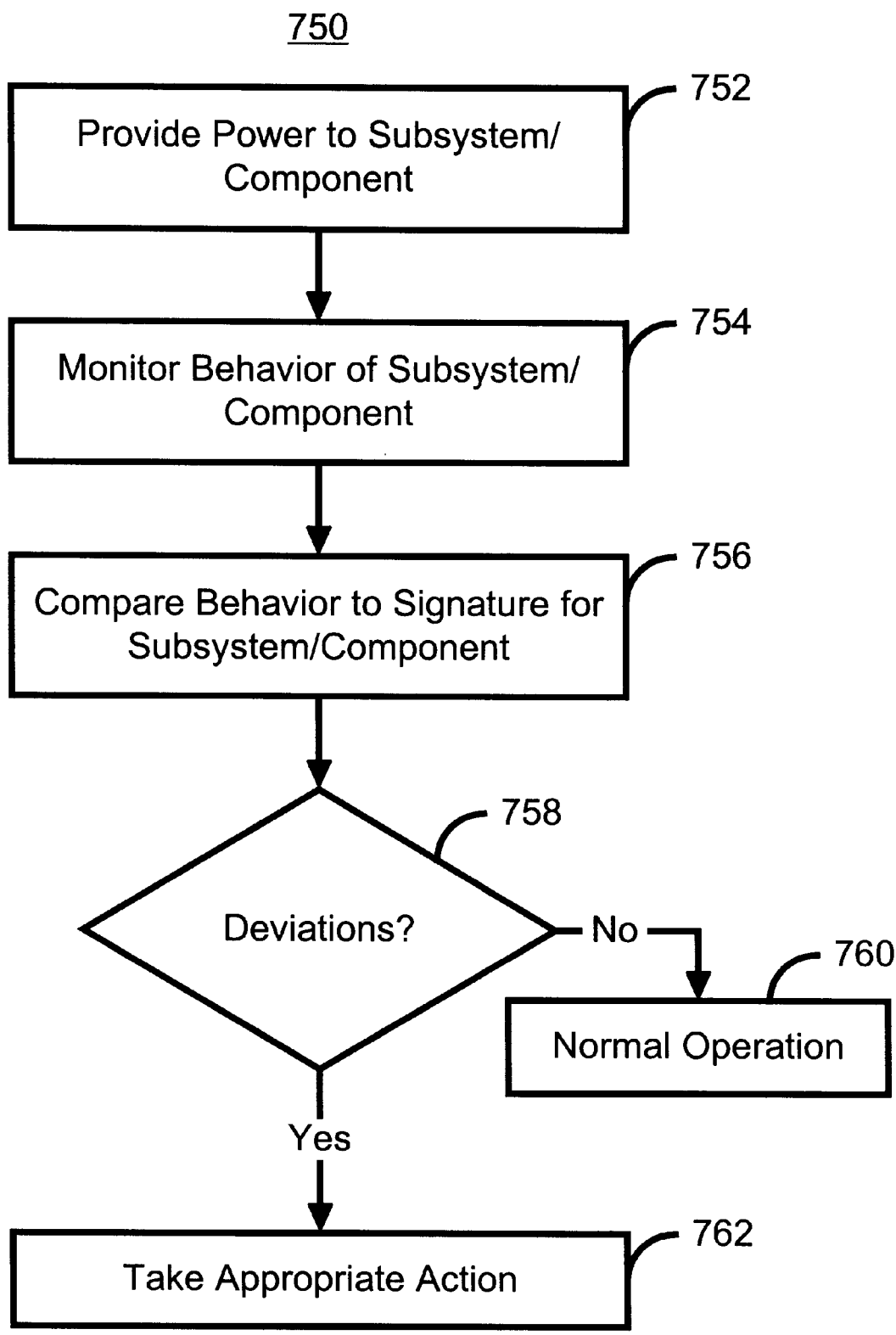
FIG. 13C depicts a more detailed flow chart of one embodiment of a method for utilizing the signatures of a subsystem using the power management module in accordance with the present invention.

FIG. 13C depicts a more detailed flow chart of one embodiment of a method 750 for utilizing the signatures of a subsystem using the PMM 100 in accordance with the present invention. Although the method 750 is described in the context of a single subsystem or component, the method 750 may be carried out in parallel for multiple subsystems or components. The method 720 may be considered to be a special case of carrying out step 54 of the method 50 depicted in FIG. 1E. Referring back to FIG. 13C, power is provided to the subsystem or component to be used, via step 752. Step 752 may be performed by closing the appropriate switch in the PMM 100 which allows the power supply to be connected to the component or subsystem. However, for the alternator or battery, a switch in the PMM 100 may not be utilized because the switch in the PMM 100 may not directly control whether power is provided to the alternator or battery. The behavior of the subsystem or component is then monitored, via step 754. Step 754 preferably includes determining the current and voltage characteristics for the component or subsystem for a particular time. The time for which the subsystem or component is monitored may depend upon the characteristics of the subsystem or component. For example, the cranking subsystem may be monitored for thirty seconds, while another component or subsystem may be monitored for more or less time. Furthermore, the time for which the behavior is monitored in step 754 is preferably the time for which behavior is monitored in step 704, shown in FIG. 13A. Referring back to FIG. 13C, the signature is then compared to the monitored behavior, via step 756. It is then determined whether deviations have occurred from the signature, via step 758. In one embodiment, step 758 measures the size of the deviations and determines whether the deviations are significant enough to take action. If the deviations are not significant enough, then normal operation is continued, via step 760. If, however, deviations are significant enough, then appropriate action is taken, via step 762.

Figure 13D:
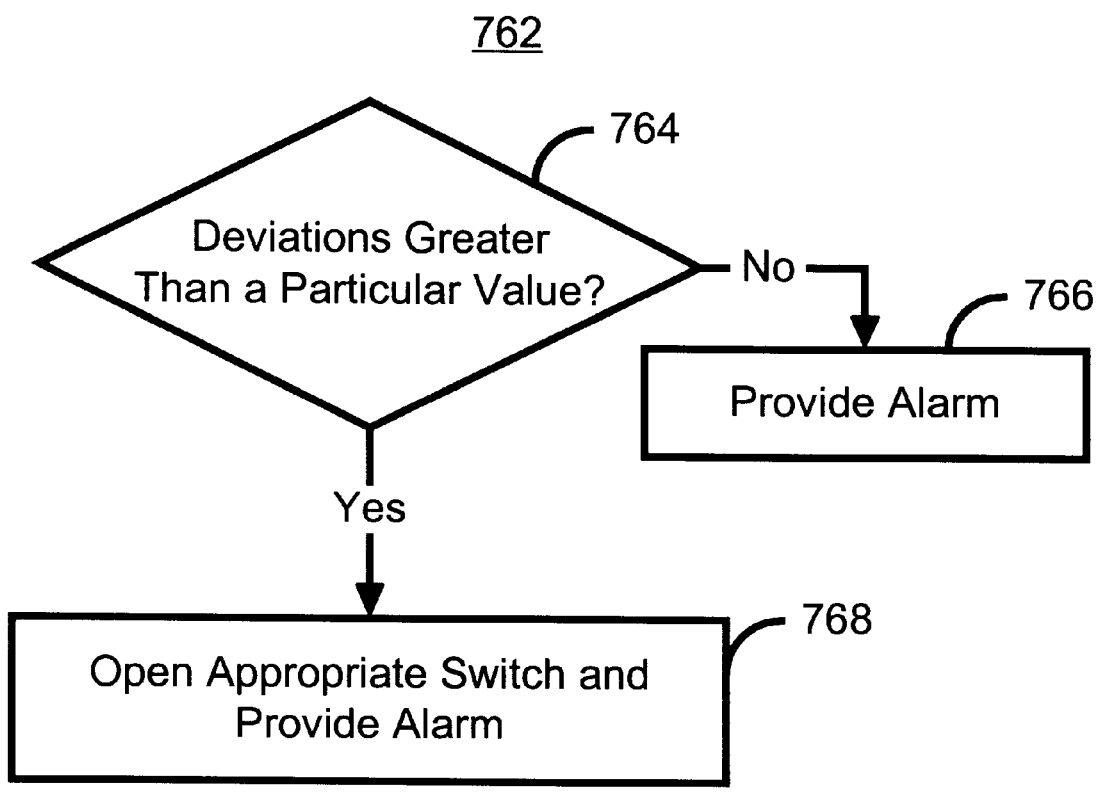
FIG. 13D depicts one embodiment of a method for taking action based on the signatures of a subsystem using the power management module in accordance with the present invention.

FIG. 13D depicts one embodiment of a method for taking action in step 762 based on the signatures of a subsystem using the PMM 100 in accordance with the present invention. It is determined if the deviations are greater than a particular value, via step 764. The value is preferably larger than the size of a deviation, determined in step 758, that is required for any action to be taken. If the deviations are not large enough, then an alarm is provided to the user, via step 766. Thus, a user can look into and correct the deviations at a more convenient time. If the deviations are larger than the particular value, then the switch in the PMM 100 which allows power to flow to the component or subsystem is opened and an alarm is provided, via step 768. For example, suppose the signature indicates that the current through the cranking system should be approximately nine hundred amps. If it is determined that the current through the motor is one thousand five hundred amps (a deviation of six hundred amps) in 764, then an alarm is sounded in step 766. If, however, it is determined that the current through the motor is three thousand amps (a deviation of one thousand one hundred amps) then the switch to the cranking system may be opened in step 768. Thus, damage to the truck tractor or the PMM 100 is prevented and a user is alerted to the problem with the subsystem or component.

For example, the PMM 100 can protect an alternator from a failure of a phase. When one phase of the alternator fails, a three-phase alternator will generate only two-thirds of the power. This will put significant stress on the two working phases of the alternator, which leads to quick and progressive failure of all phases of the alternator. The PMM 100 can detect the loss of a phase through alternator signature recognition using the method 750, and, for example, the signatures depicted in FIGS. 12B and 12C. In response, the PMM 100 can reduce the demand on the alternator by opening appropriate switch(es) and provide an alarm as discussed in FIG. 13D.

Similarly, the PMM can protect the alternator from failure due to an electrical short or open circuit of its rotor windings using the methods 700, 750 and 762. When shorted or open condition develops, the alternator will generate reduced electrical power. The PMM 100 can detect the short or open by comparing the behavior of the alternator with its signature, as discussed in the method 750. The demand on the alternator can be reduced using the method 762 and an alarm provided. Thus, the alternator can be repaired at the next scheduled maintenance, rather failing unexpectedly.

Furthermore, the signature obtained using the method 700 can be used to detect and account for the failure of the belt and pulley system driving the alternator. Generally, an internal combustion engine drives the alternator using a belt and pulley drive system. One common problem is that the belt and/or pulley slip. When the belt or pulley slips, the alternator cannot generate power that it is designed to generate. The slip condition heats up the belt, pulley, alternator bearings and other portions of the truck tractor. The combination of the lack of power generated and heat built up can disable the vehicle. The PMM 100 can detect these conditions. This is accomplished by knowing the engine speed from communication with an engine control module or other means, and monitoring the alternator signature ripples, using the method 750. Under the normal conditions, the ratio between alternator frequency and engine speed is a fixed ratio. When belt breaks or slips this ratio will change. Thus, a difference in this ratio for the alternator as monitored and the signature as stored can indicate the existence of belt or pulley slippage. The PMM 100 can then take appropriate action, for example using the method 762.

In addition, the PMM 100 can use the methods 700, 750 and 762 to detect and account for freewheeling. Freewheeling occurs when that the starter is turning but the pinion gear is not mechanically engaged with the engine ring gear. The amount of current drawn by starter (cranking subsystem) during freewheeling is lower than normal. By monitoring the level of current drawn by the cranking subsystem and comparing it to the signature for the cranking subsystem, freewheeling can be detected. The PMM 100 can then take appropriate action, for example using the method 762.

Figure 14A:
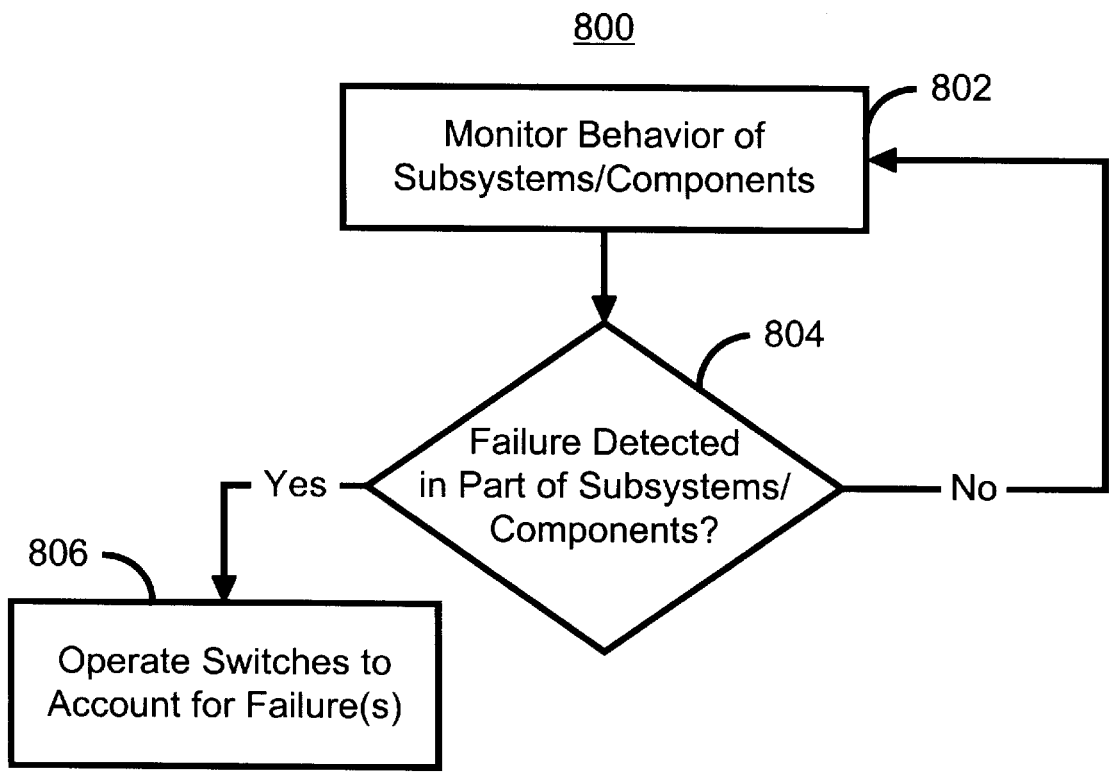
FIG. 14A is a high-level flow chart of one method for diagnosing and protecting against failures of a subsystem using the power management module in accordance with the present invention.

The PMM 10 or 100 can also be used to provide other functions, for example the PMM can provide spiking, shorting or reverse polarization connection protection. FIG. 14A is a high-level flow chart of one embodiment of a method 800 for providing protection against failures using the PMM 10 or 100 in accordance with the present invention. Subsystems or components in the device are monitored, via step 802. The subsystems or components are monitored in order to detect failures. It is determined whether a failure has occurred using the monitored behavior, via step 804. Such a failure may include a spike, a short, an open circuit, a component connected in reverse polarity or other electrical failure. If a failure has not occurred, then the subsystems or components are continued to be monitored, via step 802. If a failure has occurred, then the switch(es) coupled to portions of the subsystems or components in which the failure occurred are operated to account for the failure, via step 806. The portions of the device in which the failure occurred may thus be isolated. As a result, the remainder of the device may be protected from these failures, and other, perhaps potentially catastrophic, failures prevented.

Figure 14B:
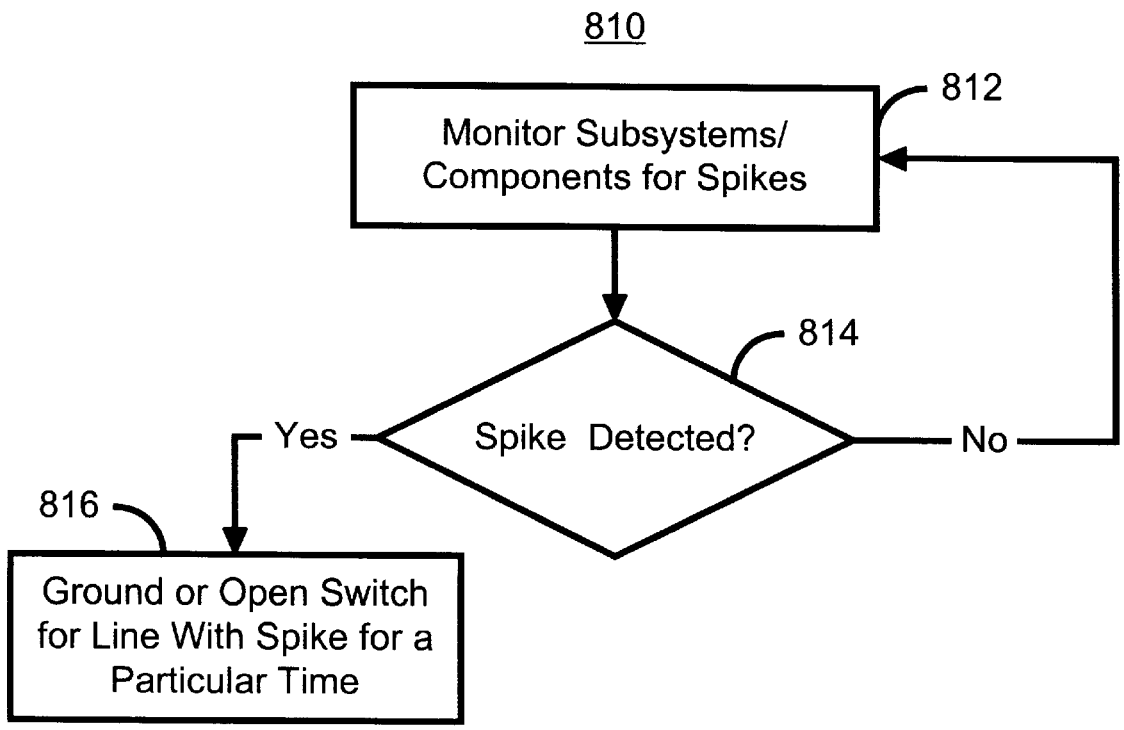
FIG. 14B depicts one embodiment of a method for providing protection against spiking of power to a subsystem using the power management module in accordance with the present invention.
Figure 14C:
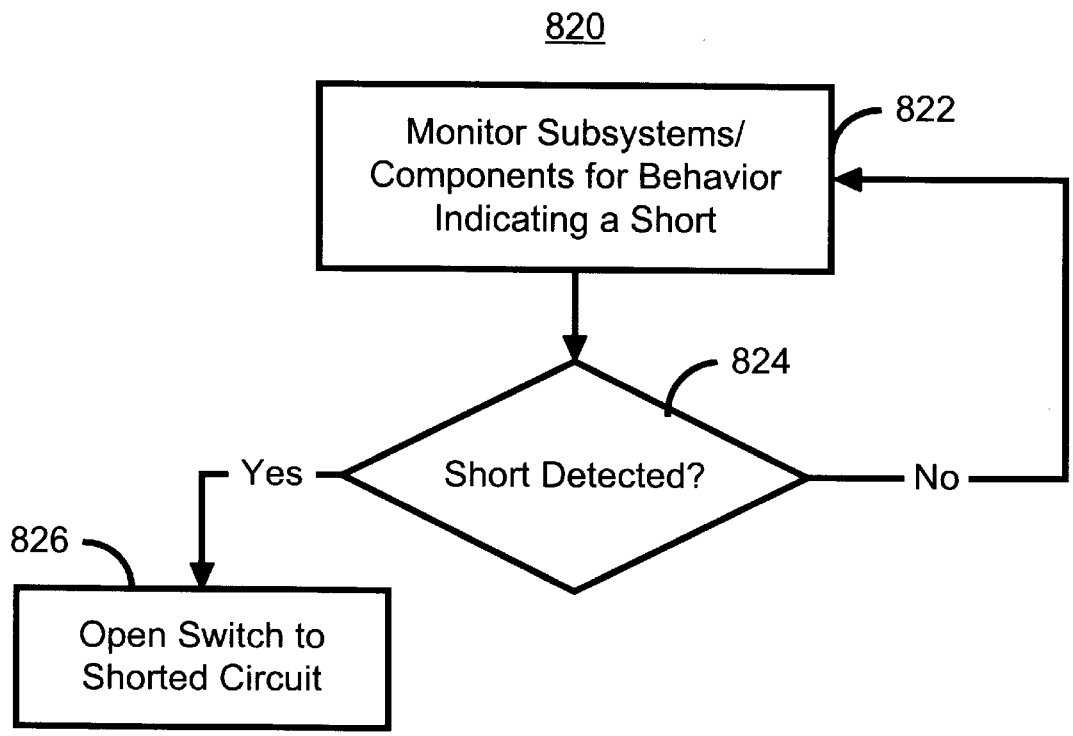
FIG. 14C depicts one embodiment of a method for providing protection against shorting of a line in a subsystem using the power management module in accordance with the present invention.
Figure 14D:
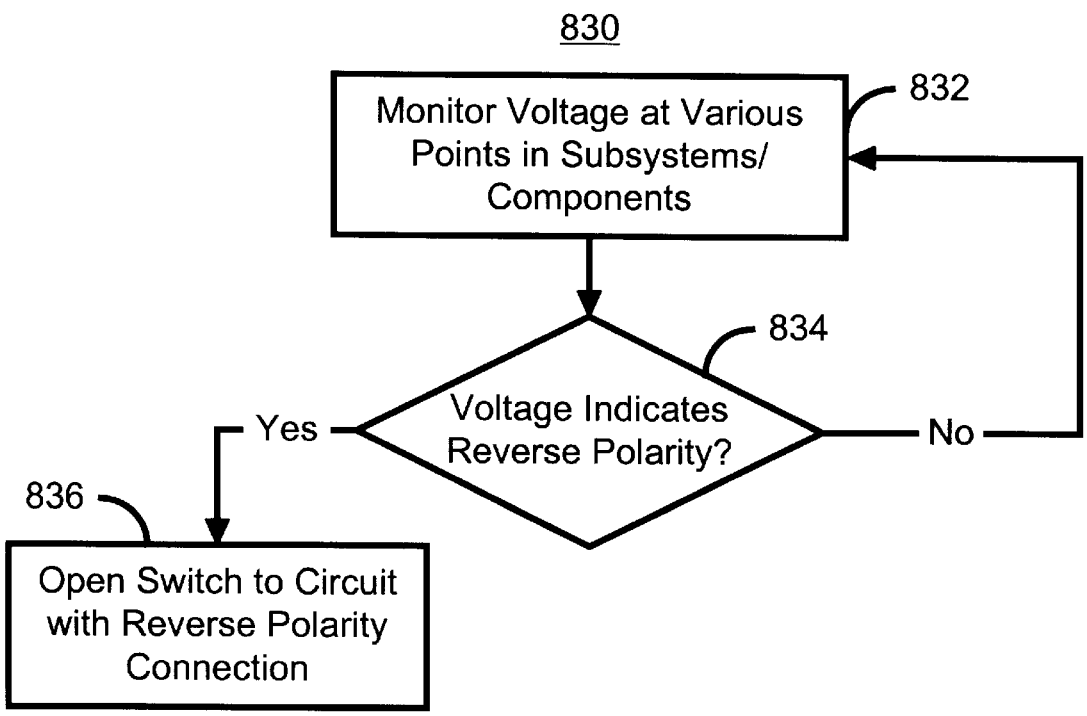
FIG. 14D depicts one embodiment of a method for providing protection against connection of a subsystem to a device having a reverse polarity using the power management module in accordance with the present invention.

FIGS. 14B–14D depict specific examples of the method 800 depicted in FIG. 14A. Preferably, the methods of FIGS. 14B–14D are carried out in a PMM 10 or 100 in a truck tractor. However, the methods could be performed in another device. FIG. 14B depicts one embodiment of a method 810 for providing protection against spiking of power to a subsystem using the PMM 10 or 100 in accordance with the present invention. Subsystems in the device are monitored for spikes, via step 812. Spikes may occur for a variety of reasons. For example, voltage spikes may occur when electrical loads are disconnected suddenly. It is determined whether a spike has occurred, via step 814. If a spike has not occurred, then the subsystems are continued to be monitored for spikes, via step 812. If a spike has occurred, then the line on which the spike has occurred is grounded or the switch (es) for the line opened for a short time, via step 816. The subsystems are then continued to be monitored, via step 812.

FIG. 14C depicts one embodiment of a method 820 for providing protection against shorting of a line in a subsystem using the PMM 10 or 100 in accordance with the present invention. The voltage and current through subsystems are monitored, via step 822. It is then determined whether the parameters for one or more of the subsystems is different from normal, due to a short circuit, via step 824. If the parameters are not different due to a short, then the subsystems are still monitored, via step 822. If the parameters are different due to a short, then the switch in the PMM 10 or 100 for the subsystem which is shorted is opened, via step 826. The subsystems are continued to be monitored, via step 822.

Similarly, the PMM 10 or 100 can protect the alternator from failure due to an electrical short or open circuit of its rotor windings using an application of the method depicted in FIGS. 14A–14C. When shorted or open condition develops, the alternator will generate reduced electrical power. The PMM 10 or 100 can detect the short or open circuit by comparing the behavior of the alternator with its signature. The signature of the alternator is the behavior of the alternator when operating normally. For example, the signature of the alternator might include the current and/or voltage characteristics of the alternator for a particular time during normal operation. Thus, the PMM 10 or 100 monitors the behavior of the alternator and determines, based on the monitored behavior and the signature, whether there is a short or an open circuit. The PM 10 or 100 may detect the short or open circuit based on the differences between the monitored behavior and the signature. In response to detection of a short or open circuit, the demand on the alternator can be reduced using pulse width modulation (toggling a switch coupled to the alternator) and an alarm provided, instead of grounding the line or merely opening the switch as discussed in FIGS. 5A and 5B. Thus, a short or open the alternator can be detected and repaired at the next scheduled maintenance, rather failing unexpectedly.

Figure 14E:
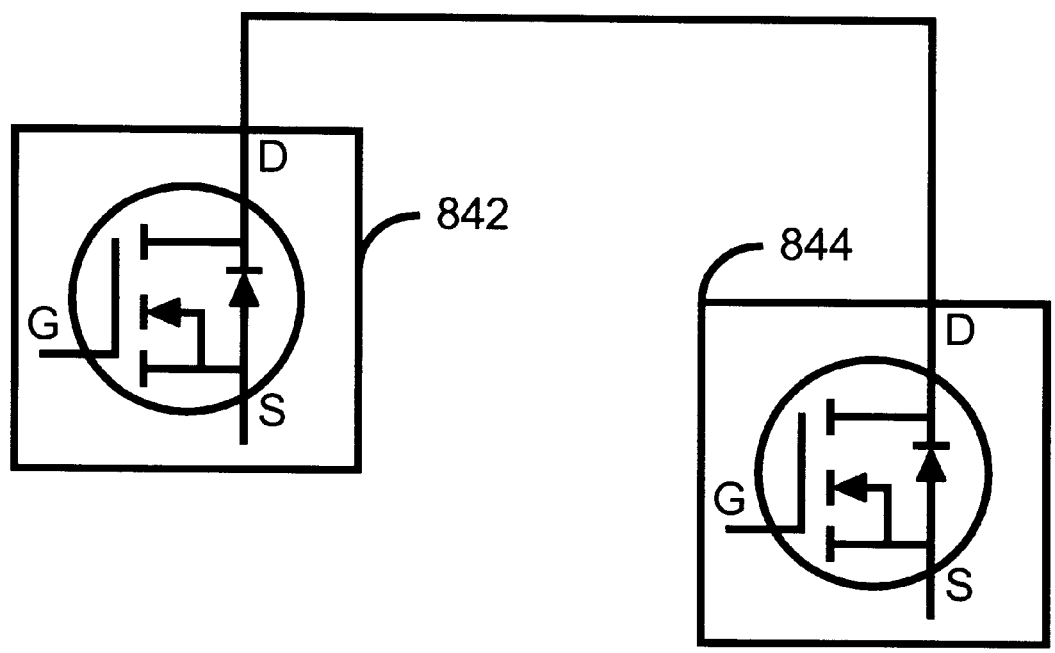
FIG. 14E depicts one embodiment of how MOSFET switches could be coupled for protecting a device from a reverse polarity connection in the power management module in accordance with the present invention.
Figure 14F:
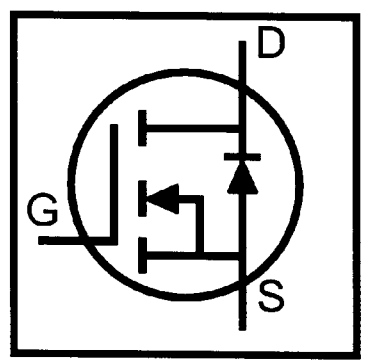
FIG. 14F depicts one embodiment of how a MOSFET switch could be coupled for protecting a device from a reverse polarity connection in the power management module in accordance with the present invention.

FIG. 14D depicts one embodiment of a method 830 for providing protection against connection of a subsystem to a device having a reverse polarity using the PMM 10 or 100 in accordance with the present invention. The voltage levels at various points in the truck tractor are monitored by the PMM 10 or 100, via step 832. It is determined, based on the monitored levels, whether there is a voltage difference due to an apparatus being connected in the reverse polarity, via step 834. If not, then the voltage levels are continued to be monitored, via step 832. If it is determined that a reverse polarity problem exists in step 834, then the switch to the affected subsystem is closed or opened, via step 836. The switches may be opened in step 836 when two MOSFET switches, such as the switches 842 and 844 depicted in FIG. 14E, are used in the PMM 10 or 100. In such an embodiment, one switch 842 is placed backward in relation to the other switch 844. The switch may be closed in step 836 when only one MOSFET switch, such as the switch 846 depicted in FIG. 14F, is used in the PMM 10 or 100. Referring back to FIG. 14D, step 836, therefore, cuts off the affected subsystem. Thus, the PMM 10 or 100 can protect portions of the truck tractor against spikes, shorts, and connection to a device having in a reverse polarity.

Figure 15:
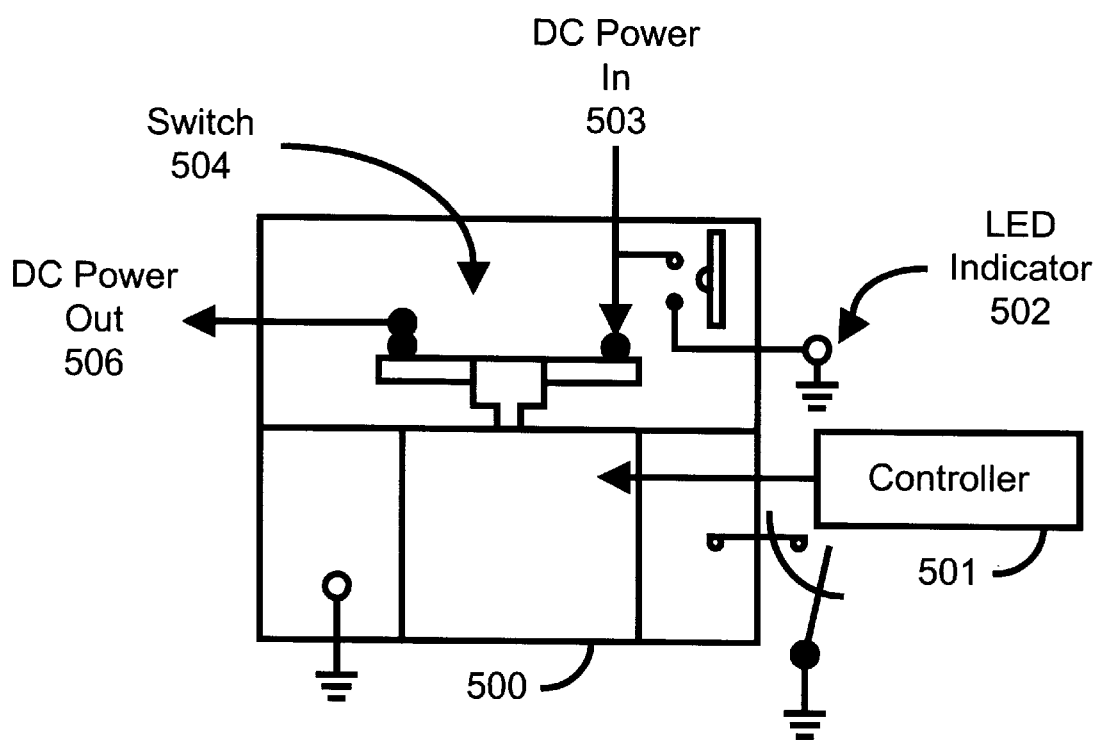
FIG. 15 depicts one embodiment of a system for using the using the power management module in accordance with the present invention in conjunction with a manual cut-off switch.

FIG. 15 depicts one embodiment of a system using the PMM 100 in conjunction with a manual on/off, or cut-off, switch 500. For clarity, only a portion of the PMM 100, which includes the controller 501 and the switch 504, is depicted. Thus, cut-off of the intelligent switch is highlighted. The manual on/off switch 500 is used so that when open, power cannot be provided to any portion of the truck tractor. The manual on/off switch 500 may be used in cases where providing power to any system is dangerous, such as when an accident has occurred. Normally, the manual on/off switch 500 is closed, as shown in FIG. 15. Consequently, the controller 501 controls the switch 504 so that the switch 504 is closed. Thus, power can be provided to any of the subsystems of the truck tractor. If the manual on/off switch is opened, then the controller 501 ensures that the switch 504 is open. When the switch 504 is open, no power can flow to the subsystems of the truck tractor. Furthermore, the switch to the LED 502 is closed. Thus, a small amount of power is provided to the LED 502, which indicates that manual cut-off of power to the subsystems of the truck tractor has been engaged.

Thus, the PMM can utilize its controller, switches, internal sensors or other components to function as an intelligent switch. Thus, the PMM can control power to the various portions of the device in which the PMM is used based on a variety of factors. The PMM can diagnose minor failures, thereby predicting more catastrophic failures, and act accordingly. Thus, appropriate switches may opened, closed or grounded in order to prevent the failures having a significant impact on the device. As a result, performance of the power supply is improved, reliability of the power supply and other portions of the device are improved, and failures are reduced.

A method and system has been disclosed for an intelligent power management system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for managing power in a device having a power source, the power source including a power storage unit capable of storing an amount of power, the device capable of performing a plurality of functions using the power storage unit alone, the system comprising:

a plurality of switches coupled with the power source, each of the plurality of switches being coupled with a portion of the device;

a plurality of signal inputs for receiving information from the device; and at least one controller, coupled with the plurality of switches and the plurality of signal inputs, for controlling the plurality of switches to be open or closed based on software provided to the at least one controller, the at least one controller capable of controlling the plurality of switches based upon the information provided by the plurality of signal inputs;

wherein the at least one controller further can control the plurality of switches to control power generation and storage in the power storage unit and to allow power to flow to a first portion of the device only if a signature of the power source and/or the power storage unit is within a deviation of a known signature for the power source and/or the power storage unit.

2. The system of claim 1 wherein the device is an automotive system.

3. The system of claim 2 wherein the automotive system includes a truck tractor.

4. The system of claim 1 wherein the device includes a satellite.

5. The system of claim 1 wherein the device includes a boat.

6. The system of claim 1 wherein the plurality of switches include a plurality of solid state switches.

7. The system of claim 6 wherein the plurality of solid state switches include a plurality of MOSFETs.

8. The system of claim 1 further comprising:
a plurality of internal sensors coupled with the at least one controller, the at least one controller capable of controlling the plurality of switches based on data from the plurality of internal sensors.

9. The system of claim 1 further comprising:
a plurality of signal outputs for providing a plurality of control signals to the device.

10. The system of claim 1 wherein the at least one controller toggles the plurality of switches.

11. The system of claim 10 wherein the at least one controller toggles the plurality of switches to eliminate in-rush current.

12. A method for managing power in a device having a power source, the power source including a power storage unit capable of storing an amount of power, the device capable of performing a plurality of functions using the power storage unit alone, the method comprising the steps of:
providing a plurality of switches coupled with the power source, each of the plurality of switches being coupled with a portion of the device;
providing a plurality of signal inputs for receiving information from the device; and
providing at least one controller, coupled with the plurality of switches and the plurality of signal inputs, for controlling the plurality of switches to be open or closed based on software provided to the at least one controller, the at least one controller capable of controlling the plurality of switches based upon the information provided by the plurality of signal inputs;
wherein the at least one controller further can control the plurality of switches to control power generation and storage in the power storage unit and to allow power to flow to a first portion of the device only if a signature of the power source and/or the power storage unit is within a deviation of a known signature for the power source and/or the power storage unit.

13. The method of claim 12 wherein the device is an automotive system.

14. The method of claim 13 wherein the automotive system includes a truck tractor.

15. The method of claim 12 wherein the device includes a satellite.

16. The method of claim 12 wherein the device includes a boat.

17. The method of claim 12 wherein the plurality of switches include a plurality of solid state switches.

18. The method of claim 17 wherein the plurality of solid state switches include a plurality of MOSFETs.

19. The method of claim 12 further comprising the step of:
providing a plurality of internal sensors coupled with the at least one controller, the at least one controller capable of controlling the plurality of switches based on data from the plurality of internal sensors.

20. The method of claim 12 further comprising the step of:
providing a plurality of signal outputs for providing a plurality of control signals to the device.

21. The method of claim 12 wherein the at least one controller toggles the plurality of switches.

22. The method of claim 21 wherein the at least one controller toggles the plurality of switches to eliminate in-rush current.

23. A method for managing power in a device having a power source, the power source including a power storage unit capable of storing an amount of power, the device capable of performing a plurality of functions using the power storage unit alone, the method comprising the steps of:
utilizing a plurality of switches and at least one controller to control power being stored by the power source, each of the plurality of switches being coupled with the power source and a portion of the device, the at least one controller being coupled with the plurality of switches and a plurality of signal inputs, the plurality of signal inputs a plurality of signal inputs for receiving information from the device, the at least one controller controlling the plurality of switches to be open or closed based on software provided to the at least one controller, the at least one controller capable of controlling the plurality of switches based upon the information provided by plurality of signal inputs;
wherein the at least one controller further can control the plurality of switches to control power generation and storage in the power storage unit and to allow power to flow to a first portion of the device only if a signature of the power source and/or the power storage unit is within a deviation of a known signature for the power source and/or the power storage unit.

24. The method of claim 23 wherein the device is an automotive system.

25. The method of claim 24 wherein the automotive system includes a truck tractor.

26. The method of claim 23 wherein the device includes a satellite.

27. The method of claim 23 wherein the device includes a boat.

28. The method of claim 23 wherein the plurality of switches include a plurality of solid state switches.

29. The method of claim 28 wherein the plurality of solid state switches include a plurality of MOSFETs.

30. The method of claim 23 wherein the controlling step further includes the step of:
utilizing the at least one controller to control the a plurality of switches using data from a plurality of internal sensors coupled with the at least one controller.

31. The method of claim 23 further comprising the step of:
controlling a plurality of sections of the device by providing a plurality of control signals to the plurality of sections of the device using a plurality of signal outputs.

32. The method of claim 23 wherein the at least one controller toggles the plurality of switches.

33. The method of claim 32 wherein the at least one controller toggles the plurality of switches to eliminate in-rush current.

* * * * *